United States Patent
Zhang et al.

(10) Patent No.: US 12,010,754 B2
(45) Date of Patent: Jun. 11, 2024

(54) ENHANCED CONNECTED MODE DRX PROCEDURES FOR NR

(71) Applicant: InterDigital Patent Holdings, Inc., Wilmington, DE (US)

(72) Inventors: Guodong Zhang, Woodbury, NY (US); Pascal M. Adjakple, Great Neck, NY (US); Lakshmi R. Iyer, King of Prussia, PA (US); Stephen E. Terry, Northport, NY (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 65 days.

(21) Appl. No.: 16/637,326

(22) PCT Filed: Aug. 10, 2018

(86) PCT No.: PCT/US2018/046296
§ 371 (c)(1),
(2) Date: Feb. 7, 2020

(87) PCT Pub. No.: WO2019/033017
PCT Pub. Date: Feb. 14, 2019

(65) Prior Publication Data
US 2020/0245395 A1 Jul. 30, 2020

Related U.S. Application Data

(60) Provisional application No. 62/615,773, filed on Jan. 10, 2018, provisional application No. 62/564,461, (Continued)

(51) Int. Cl.
*H04W 76/28* (2018.01)
*H04W 76/19* (2018.01)
*H04W 80/02* (2009.01)

(52) U.S. Cl.
CPC .......... *H04W 76/28* (2018.02); *H04W 76/19* (2018.02); *H04W 80/02* (2013.01)

(58) Field of Classification Search
CPC ..... H04W 76/28; H04W 76/19; H04W 80/02; H04B 7/0695; H04B 7/088; H04L 5/0091; H04L 5/0053; H04L 5/001; H04L 5/0023
See application file for complete search history.

(56) References Cited

U.S. PATENT DOCUMENTS

2014/0254050 A1  9/2014  Haines et al.
2015/0173016 A1  6/2015  Heo et al.
(Continued)

FOREIGN PATENT DOCUMENTS

CN   104412524 A   3/2015
CN   105359429 A   2/2016
(Continued)

OTHER PUBLICATIONS

3GPP TR 38.913 V0.2.0, "3rd Generation Partnership Project; Technical Specification Group Radio Access Network; Study on Scenarios and Requirements for Next Generation Access Technologies; (Release 14)", Feb. 2016, 19 pages.
(Continued)

*Primary Examiner* — Will W Lin
(74) *Attorney, Agent, or Firm* — Flaster Greenberg, P.C.

(57) ABSTRACT

Embodiments described herein include DRX operations that address impacts of beamforming to current DRX operations. It is recognized herein that the new NR-PDCCH may affect the downlink control channel monitoring in DRX operations. DRX embodiments described herein also address the impact of new NR-PDCCH to DRX operations. It is further recognized herein that, in NR, multiple DRX configurations may be supported, and L1/2 signaling (such as MAC CE
(Continued)

based) can be used for dynamic DRX configuration switching. Embodiments described herein include signaling and other mechanisms that support multiple DRX configurations, and switching between multiple configurations. Embodiments described herein also include DRX operations that address the impact of HARQ design in NR to DRX operations. Embodiments described herein further include DRX operations that address the impact of multiple SR configurations in NR to DRX operation.

20 Claims, 20 Drawing Sheets

Related U.S. Application Data filed on Sep. 28, 2017, provisional application No. 62/543,755, filed on Aug. 10, 2017.

(56) References Cited

U.S. PATENT DOCUMENTS

| | | | |
|---|---|---|---|
| 2016/0044641 A1 | 2/2016 | Bai et al. | |
| 2016/0050605 A1 | 2/2016 | Kim et al. | |
| 2016/0142961 A1 | 5/2016 | Schmidt et al. | |
| 2016/0294531 A1* | 10/2016 | Loehr | H04W 72/0446 |
| 2017/0055242 A1 | 2/2017 | Kusashima et al. | |
| 2017/0202054 A1* | 7/2017 | Rathonyi | H04W 72/23 |
| 2018/0049271 A1* | 2/2018 | Bagheri | H04W 24/02 |
| 2018/0198572 A1* | 7/2018 | Wang | H04L 1/1812 |
| 2018/0220345 A1* | 8/2018 | Moon | H04B 7/088 |
| 2018/0359064 A1* | 12/2018 | Kim | H04W 56/0005 |
| 2018/0368157 A1* | 12/2018 | Jeon | H04W 72/044 |
| 2019/0116630 A1* | 4/2019 | Fan | H04W 72/12 |
| 2020/0022126 A1* | 1/2020 | You | H04W 74/0833 |
| 2020/0296627 A1* | 9/2020 | Arvidson | H04W 28/0835 |

FOREIGN PATENT DOCUMENTS

| | | |
|---|---|---|
| JP | 2017-017633 A | 1/2017 |
| WO | 2010/147956 A2 | 12/2010 |
| WO | 2018/232259 A1 | 12/2018 |

OTHER PUBLICATIONS

3GPP TSG-RAN WG1 NR AdHoc R1-1700820, Qualcomm Incorporated, "UE Power Evaluation for DRX with Wake-Up Signaling", Jan. 2017, 7 Pages.
3GPP TSG-RAN WG2 #98 R2-1704913, InterDigital Inc., "C-DRX for Multiple Numerologies", May 2017, 12 pages.
3GPP TSG-RAN WG2 #98-AH Tdoc R2-1707123, Ericsson, "DRX with Asynchronous HARQ", Jun. 2017, 4 pages.
3GPP TSG-RAN WG2 Meeting #98 R2-1704863, Huawei et al., "Consideration on Beam Management with C-DRX", May 2017, 4 pages.
3GPP TSG-RAN WG2 NR AH#2 R2-1706683, InterDigital Inc., "C-DRX With Multiple Configurations", Jun. 2017, 5 pages.
3GPP TSG RAN WG2 #100 "DRX operation for cross slot PDCCH monitoring," R2-1712201, Oppo, 10.3.1.10, Nov. 27, 2017-Dec. 1, 2017, pp. 3.
3GPP TSG-RAN WG2 #100 "BWP Inactivity Timer and DRX," R2-1713469, Ericsson, 10.3.1.10, Nov. 27, 2017-Dec. 1, 2017, pp. 3.
3GPP TSG-RAN WG2 #100 "Remaining issues on DRX timers," R2-1713471, Ericsson, 10.3.1.10, Nov. 27, 2017-Dec. 1, 2017, pp. 7.
3GPP TSG-RAN WG2 #100 "Remaining issues on DRX," R2-1712975, Nokia, 10.3.1.10, Nov. 27, 2017-Dec. 1, 2017, pp. 2.
3GPP TSG-RAN WG2 Meeting #100 "DRX timer for SPS," R2-1712700, Samsung, 10.3.1.10, Nov. 26, 2017-Dec. 1, 2017, pp. 2.
3GPP TSG-RAN WG2 Meeting #100 "Enhancement of DRX," R2-1712319, 10.3.1.10, Nov. 27, 2017-Dec. 1, 2017, pp. 2.
3GPP TSG-RAN WG2 Meeting #100 "Remaining issues on DRX," R2-1712318, 10.3.1.10, Nov. 27, 2017-Dec. 1, 2017, pp. 2.
3GPP TSG-RAN WG2 Meeting #100 "Remaining issues on DRX," R2-1712442, 10.3.1.10, Nov. 27, 2017-Dec. 1, 2017, pp. 3.

* cited by examiner

| D_6 | D_5 | D_4 | D_3 | D_2 | D_1 | R | R | Oct 1

FIG. 20

| R | R | D_6 | D_5 | D_4 | D_3 | D_2 | D_1 | Oct 1

FIG. 21

| R | R | A | | | | | | Oct 1
| D_6 | D_5 | D_4 | D_3 | D_2 | D_1 | R | R | Oct 2

FIG. 22

| R | R | LCID | | | | | | Oct 1
| R | R | D_6 | D_5 | D_4 | D_3 | D_2 | D_1 | Oct 2

FIG. 23

```
DRX-Config ::=                          CHOICE {
    release                                 NULL,
    setup                                   SEQUENCE {
        drx-onDurationTimer                 ENUMERATED {
                                                ms1-32, ms2-32, ms3-32, ms4-32, ms5-32, ms6-32, ms7-32, ms8-32,
ms9-32, ms10-32, ms11-32,
                                                ms12-32, ms13-32, ms14-32, ms15-32, ms16-32, ms17-32, ms18-32,
ms19-32, ms-20-32, ms21-32,
                                                ms22-32, ms23-32, ms24-32, ms25-32, ms26-32, ms27-32, ms28-32,
ms29-32, ms30-32, ms31-32,
                                                ms1, ms2, ms3, ms4, ms5, ms6, ms8, ms10, ms20, ms30, ms40,
ms50, ms60,
                                                ms80, ms100, ms200, ms300, ms400, ms500, ms600, ms800,
ms1000, ms1200,
                                                ms1600, spare9, spare8, spare7, spare6, spare5, spare4, spare3,
spare2, spare1 },
        drx-InactivityTimer                 ENUMERATED {
                                                ms0, ms1, ms2, ms3, ms4, ms5, ms6, ms8, ms10, ms20, ms30,
ms40,ms50, ms60, ms80,
                                                ms100, ms200, ms300, ms500, ms750, ms1280, ms1920, ms2560,
spare9, spare8,
                                                spare7, spare6, spare5, spare4, spare3, spare2, spare1},
        drx-HARQ-RTT-TimerDL                INTEGER (0..56),
        drx-HARQ-RTT-TimerUL                INTEGER (0..56),
        drx-RetransmissionTimerDL           ENUMERATED {
                                                sl0, sl1, sl2, sl4, sl6, sl8, sl16, sl24, sl33, sl40, sl64, sl80, sl96, sl112,
sl128,
                                                , , spare15, spare14, spare13, spare12, spare11, spare10, spare9,
                                                spare8, spare7, spare6, spare5, spare4, spare3, spare2, spare1},
        drx-RetransmissionTimerUL           ENUMERATED {
                                                sl0, sl1, sl2, sl4, sl6, sl8, sl16, sl24, sl33, sl40, sl64, sl80, sl96, sl112,
sl1128,
                                                u160sl160, u320sl320, spare15, spare14, spare13, spare12, spare11,
spare10, spare9,
                                                spare8, spare7, spare6, spare5, spare4, spare3, spare2, spare1 }, drx-LongCycleStartOffset            CHOICE {
            ms10                                INTEGER(0..9),
            ms20                                INTEGER(0..19),
            ms32                                INTEGER(0..31),
            ms40                                INTEGER(0..39),
            ms60                                INTEGER(0..59),
            ms64                                INTEGER(0..63),
            ms70                                INTEGER(0..69),
            ms80                                INTEGER(0..79),
            ms128                               INTEGER(0..127),
            ms160                               INTEGER(0..159),
            ms256                               INTEGER(0..255),
            ms320                               INTEGER(0..319),
            ms512                               INTEGER(0..511),
            ms640                               INTEGER(0..639),
            ms1024                              INTEGER(0..1023),
            ms1280                              INTEGER(0..1279),
            ms2048                              INTEGER(0..2047),
            ms2560                              INTEGER(0..2559),
            ms5120                              INTEGER(0..5119),
            ms10240                             INTEGER(0..10239)
        },
        shortDRX                            SEQUENCE {
            drx-ShortCycle                      ENUMERATED {
                                                    ms2, ms3, ms4, ms5, ms6, ms7, ms8, ms10, ms14, ms16, ms20,
ms30, ms32,
                                                    ms35, ms40, ms64, ms80, ms128, ms160, ms256, ms320,
ms512, ms640, spare9,
                                                    spare8, spare7, spare6, spare5, spare4, spare3, spare2, spare1
},
            drx-ShortCycleTimer                 INTEGER (1..16)
        } OPTIONAL,
        drx-SlotOffset                      ENUMERATED {
                                                ms0, ms1-32,ms2-32, ms3-32, ms4-32, ms5-32, ms6-32, ms7-32,
ms8-32, ms9-32, ms10-32, ms11-32,
                                                ms12-32, ms13-32, ms14-32, ms15-32, ms16-32, ms17-32, ms18-32,
ms19-32, ms-20-32, ms21-32,
                                                ms22-32, ms23-32, ms24-32, ms25-32, ms26-32, ms27-32, ms28-32,
ms29-32, ms30-32, ms31-32 } }
}
```

FIG. 24

ENHANCED CONNECTED MODE DRX PROCEDURES FOR NR

CROSS-REFERENCE TO RELATED APPLICATIONS

This application is the National Stage Application of International Patent Application No. PCT/US2018/046296, filed Aug. 10, 2018, which claims the benefit of U.S. Provisional Application No. 62/543,755, filed on Aug. 10, 2017, U.S. Provisional Application No. 62/564,461, filed on Sep. 28, 2017, and U.S. Provisional Application No. 62/615,773, filed on Jan. 10, 2018, the contents of which are hereby incorporated by reference in their entireties.

BACKGROUND

In LTE/LTE-A, a user equipment (UE) in a connected mode (RRC_CONNECTED state) monitors the Physical Downlink Control Channel (PDCCH) to get the downlink transmission grant for the UE to receive downlink data on the Physical Downlink Shared Channel (PDSCH). A connected state discontinuous reception (DRX) procedure is introduced in LTE/LTE-A standards to achieve UE power savings. A DRX cycle consists of an "On Duration" and a "DRX period." During the "On Duration," a UE monitors the PDCCH for grant. Whenever a grant is received, the UE will start an "Inactive Timer." The UE keeps monitoring the PDCCH until the Inactive Timer expires or is stopped by a media access control (MAC) command. Then the UE is in the DRX period, during which the UE can go into a sleep mode to save power. A high level example of DRX operations are depicted in FIG. 1.

Referring to FIG. 2, the example DRX operation is depicted after an uplink (UL) data transmission with asynchronous hybrid automatic repeat request (HARQ). In accordance with LTE Release 13, after a UL data transmission using a UL HARQ process, a UL HARQ RTT timer is started for the UL HARQ process. In some cases, the UE need not monitor the DCI for the UL HARQ process, which means that the UE can sleep while the UL HARQ RTT timer runs if there is no other activity for the UE. When the UL HARQ RTT timer expires, the UE may start a drx-ULRetransmissionTimer for the UL HARQ process. When this timer is running, the UE monitors the PDCCH for retransmissions. In some cases, if the UE detects the PDCCH when the drx-ULRetransmissionTimer is running, the timer is stopped. Otherwise, if the drx-ULRetransmissionTimer expires and no other DRX timers are running, the UE may stop monitoring the PDCCH and might not be reachable until the next valid on Duration period. The operation in the downlink may be substantially the same as the uplink.

In LTE, the fixed timing relations for the HARQ transmissions can impose a delay regardless whether downlink or uplink data transmissions are considered. To allow for energy saving during retransmissions for the UE when entering DRX (e.g., when the drx-InactivityTimer has expired), HARQ RTT timers enable the UE to know when to not monitor the downlink for retransmissions, and when to start monitoring the DL (e.g., see FIG. 3).

When asynchronous HARQ is used in the downlink, there may be a fixed delay for transmitting the HARQ acknowledgement. Further, in some cases, there is a need for the DL HARQ RTT timer and the drx-RetransmissionTimer to control how long the UE continues to monitor the DL for a retransmission, for example, to allow for energy savings in the UE.

A DRX cycle in which no grant is received is called a connected DRX (CDRX) state. A DRX cycle in which a grant is received is considered an Active state. In CDRX cycles, for example, the UE may: 1) wake up from deep sleep; 2) spend time and energy on ramp-up; 3) monitor the PDCCH for ON duration; and 4) ramp down and go back to sleep.

SUMMARY

Embodiments described herein include DRX operations that address impacts of beamforming to current DRX operations. It is recognized herein that the new NR-PDCCH may affect the downlink control channel monitoring in DRX operations. DRX embodiments described herein also address the impact of new NR-PDCCH to DRX operations. It is further recognized herein that, in NR, multiple DRX configurations may be supported, and L1/2 signaling (such as MAC CE based) can be used for dynamic DRX configuration switching. Embodiments described herein include signaling and other mechanisms that support multiple DRX configurations, and switching between multiple configurations. Embodiments described herein also include DRX operations that address the impact of HARQ design in NR to DRX operations. Embodiments described herein further include DRX operations that address the impact of multiple SR configurations in NR to DRX operation.

In an example, an apparatus (e.g., UE), receives a configuration signal, and, based on the configuration signal, determines a processor interrupt time unit to be used for timing of a medium access control (MAC) procedure. The processor interrupt time unit may be based on at least one of: a capability of the apparatus, a minimum slot duration associated with the apparatus, or a minimum slot duration associated with a numerology. The capabilitiy of the apparatus may include a battery level associated with the apparatus, a category of the apparatus, or a power setting associated with the apparatus. The numerology may be an active uplink numerology, an active downlink numerology, a reference numerology, or a default numerology. The apparatus monitors physical downlink control channel (PDCCH) occasions having respective start times, wherein the start times are separated from each other in time by a time interval consisting of one or a multiple of the processor interrupt time unit. Further, the apparatus can receive or transmit data during time periods having respective start times separated from each other by a time interval consisting of one or a multiple of the processor interrupt time unit.

In another example, an apparatus (e.g., UE) sends a beam failure recovery report to a network node via a network. When the beam failure recovery report is sent, the apparatus may start a timer that defines a response window for the beam failure recovery report, wherein a discontinuous reception (DRX) active time includes the response window. The apparatus may suspend uplink and downlink operations until a beam failure recovery is completed. For example, the apparatus may suspend all transmissions except transmissions associated with beam failure recovery operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 20 depicts an example MAC CE SDU for DRX configuration activation or deactivation.

FIG. 21 depicts another example MAC CE SDU for DRX configuration activation or deactivation.

FIG. 22 depicts an example MAC CE PDU for DRX configuration activation or deactivation.

FIG. 23 depicts another example MAC CE PDU for DRX configuration activation or deactivation.

FIG. 24 depicts an example DRX configuration information element in accordance with an aspect of this disclosure.

DETAILED DESCRIPTION OF ILLUSTRATIVE EMBODIMENTS

As initial matter, a summary of example modem power states that can be used for use case power breakdowns described herein is included below for reference:

| Modem Power States | Description |
| --- | --- |
| Active: PDCCH-only (Inactivity timer activated and not expired) | Assuming DRX is configured and UE is in connected mode, this state may correspond to the condition that the UE's inactivity timer has started and not expired. For the purpose of this analysis, the associated ON duration may also considered part of this state. The UE may monitor the PDCCH by decoding within the search space every subframe (SF), but there is no grant. If the UE is capable of microsleep, it may go into brief sleep until the next subframe. |
| Active: Data (Inactivity timer activated and not expired) | Assuming DRX is configured and UE is in connected mode, for which UE is active, similar to the above state, but UE gets a grant for data (PDSCH or PUSCH). |
| CDRX (ON-duration-only cycle) | Assuming DRX is configured and UE is in connected mode, this state may correspond to a UE going through a "grant-less" CDRX cycle (which includes ON duration followed by sleep duration). In the example, the UE does not receive any grant during the ON duration, so its inactivity timer does not trigger. |

Figure 1:
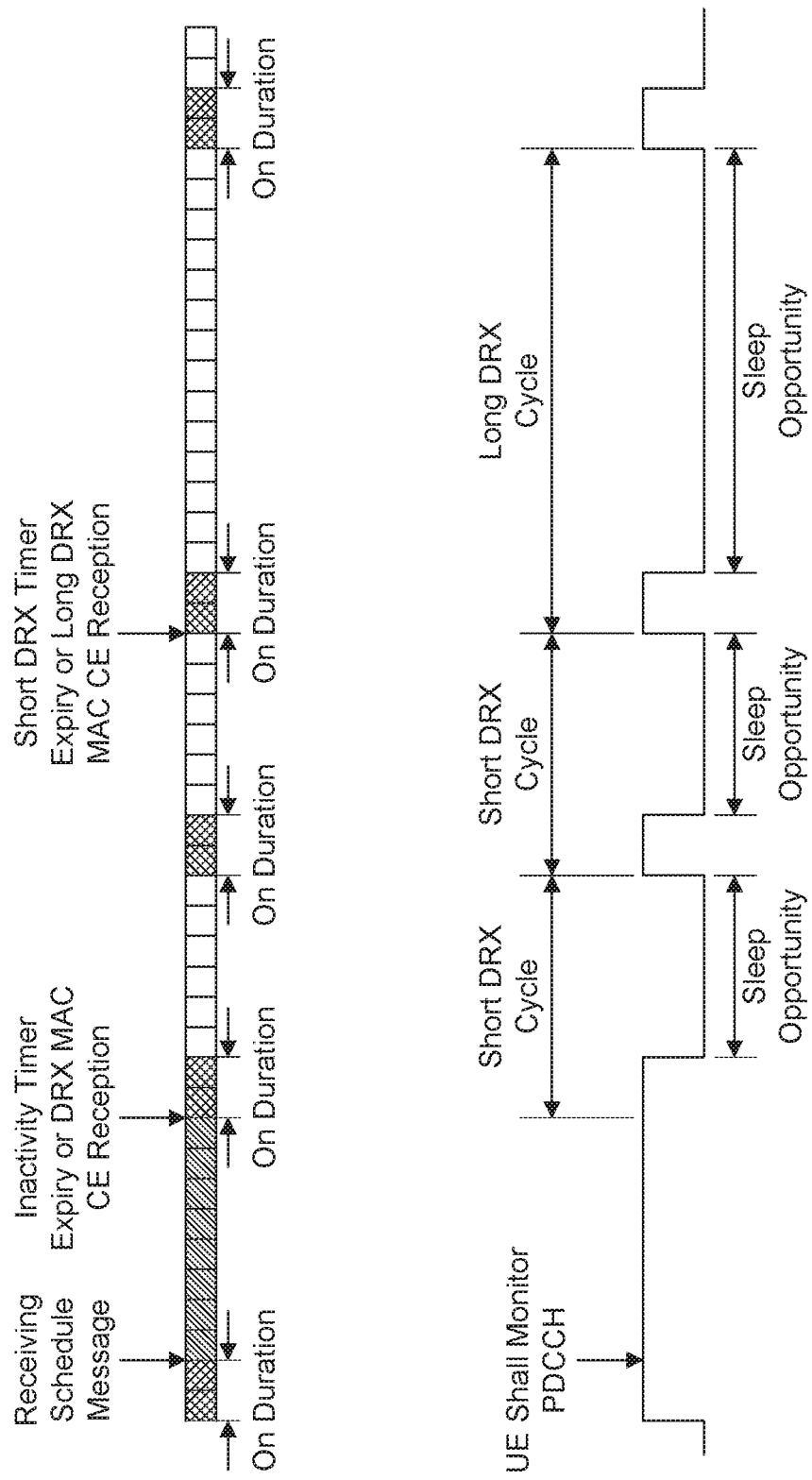
FIG. 1 shows an example of discontinuous reception (DRX) cycles and user equipment (UE) behaviors.
Figure 2:
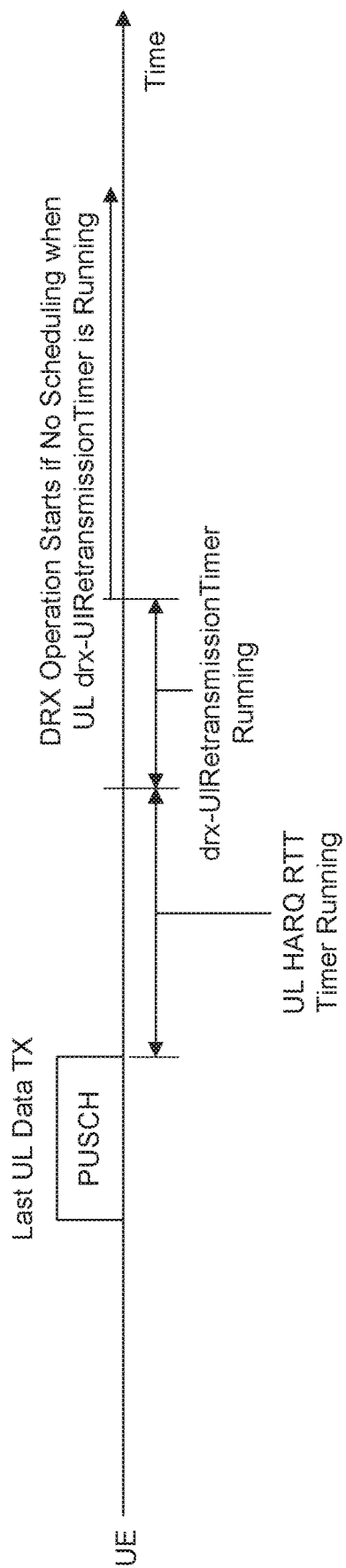
FIG. 2 depicts an example of DRX operation after the last uplink (UL) data transmission.
Figure 3:
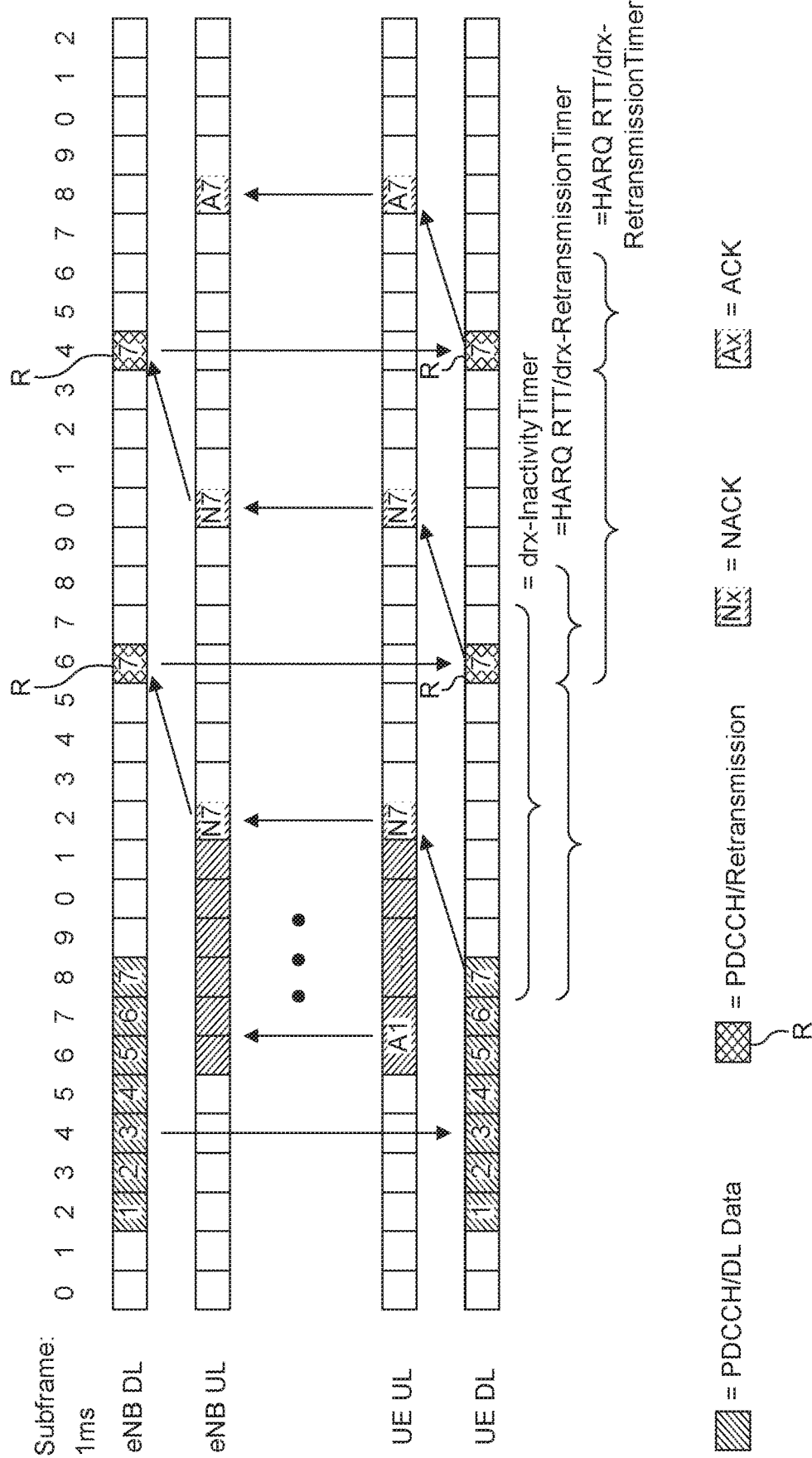
FIG. 3 depicts an example of timing relations for HARQ in DL LTE.
Figure 4:
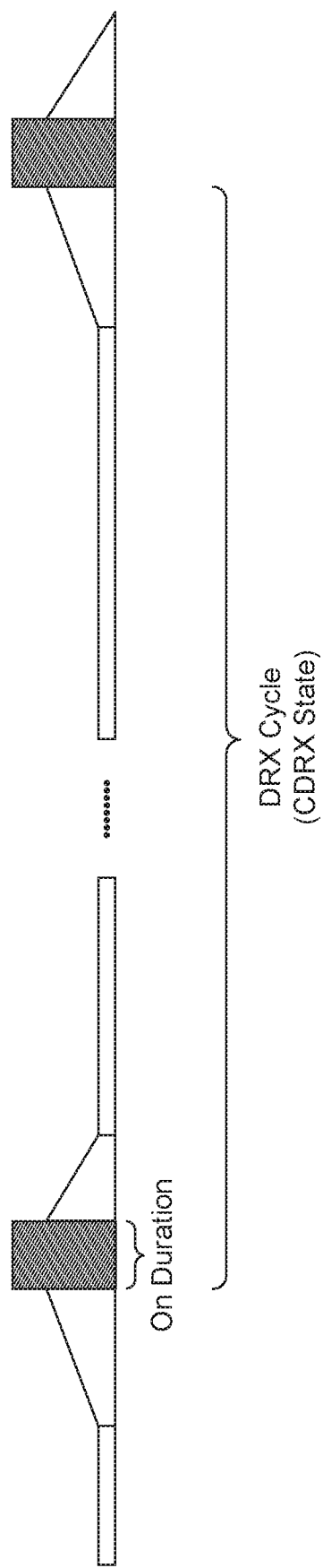
FIG. 4 depicts an example DRX cycles.
Figure 5:
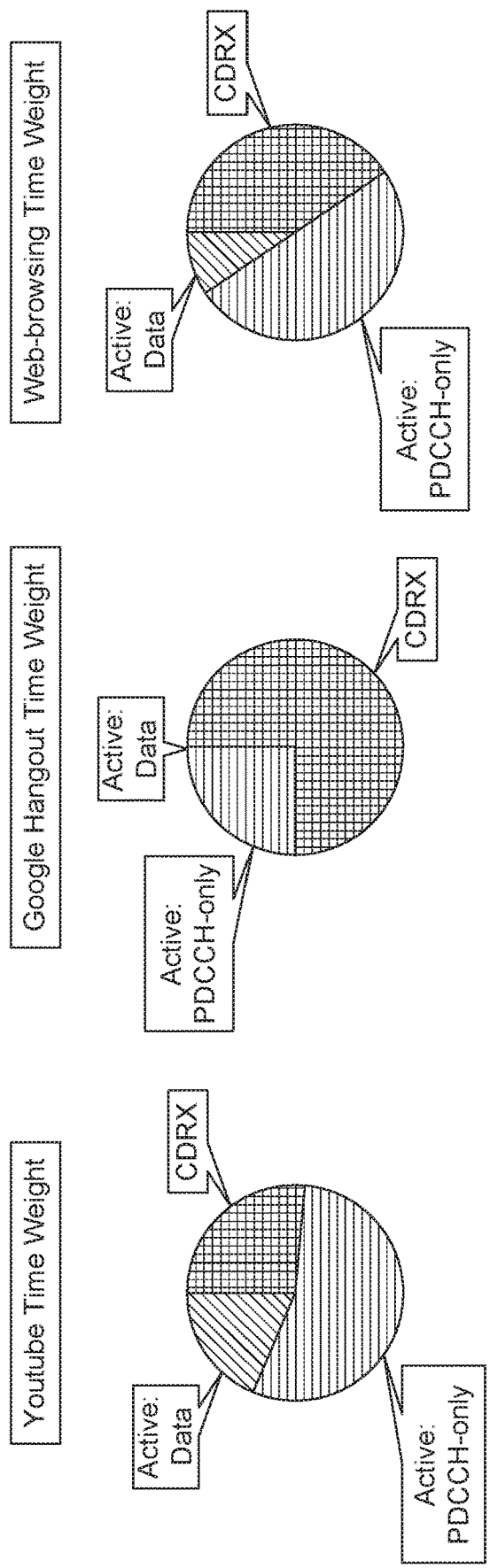
FIG. 5 depicts an example of time weight distributions for modem power states.

FIG. 5 depicts example modem power states as time weight distributions. Each chart in FIG. 5 depicts the relative time that a given UE spends in each power state that is described above, for the duration of each application session (e.g., youtube session, google hangout session, and web-browsing session).

Turning now to discontinuous reception (DRX) for short transmission time intervals (sTTI), in some cases, the units for a drx-RetransmissionTimer and drx-ULRetransmissionTimer may be the same as a hybrid automatic repeat request (HARQ) round trip time (RTT) expiry that starts the retransmission time, for instance depending on the transmission time interval (TTI) length of the transport block (TB) that is under retransmission. Legacy DRX Cycles and drxShortCycleTimers may be in number of subframes regardless of which TTI length is used. Further, a legacy onDurationTimer and drx-InactivityTimer may count the number of PDCCH-subframes regardless of which TTI length is used. A single drx-InactivityTimer and DRX Cycle may be configured. Further, a drx-RetransmissionTimer and drx-ULRetransmissionTimer for sTTI can be configured independently of each other.

In some cases, a media access control (MAC) entity can be in one DRX state (e.g., single on/off time) at any given time. When a MAC entity (e.g., apparatus or UE) is awake, it may monitor the "PDCCH" occasion. A DRX configuration may be described by various configuration parameters, such as, for example and without limitation: an on duration time, an inactivity time, a retransmission time, a short DRX cycle, long DRX cycles. In NR, one or more DRX configurations may be supported. In some cases, the DL and UL HARQ RTT timer are not static values. MAC entity, apparatus, and UE may be used interchangeably herein, without limitation, unless otherwise specified.

With respect to DL control channel design for multiple numerologies, a control resource set (CORESET) may be defined as a set of REGs under a given numerology. For example, a search space in NR may be associated with a single CORESET. In some cases, the search spaces in different control resources sets are defined independently. A control search space may include various properties, for example and without limitation: Aggregation level(s), Number of decoding candidates for each aggregation level, and the set of CCEs for each decoding candidate. In some cases, multiple CORESETs can be overlapped in frequency and time for a UE. In an example, in the time domain, a CORESET can be configured with one or a set of contiguous OFDM symbols. The configuration can indicate the starting OFDM symbol and time duration. In an example, a CORESET can be configured with only one CCE-to-REG mapping. The UE may determine whether some blind decodings can be skipped based on information on a 'group common PDCCH' (if present). The UE can be configured to "monitor DL control channel" in terms of slot or OFDM symbol with respect to the numerology of the DL control channel. In an example, "DL control channel monitoring" per 1 symbol can be performed with respect to the numerology of the DL control channel.

Turning now to wide band operation with multiple numerologies, one or more bandwidth part configurations for each component carrier can be semi-statically signaled to a UE. A bandwidth part may consist of a group of contiguous PRBs. The reserved resources can be configured within the bandwidth part. Each bandwidth part may be associated with a specific numerology (sub-carrier spacing, CP type), for RRC connected mode UE. In some cases, the bandwidth of a bandwidth part is at least as large as the SS block bandwidth. Configuration of a bandwidth part may include various properties, such as, for example and without limitation: numerology, frequency location (e.g., center frequency), and bandwidth (e.g., number of PRBs). A UE may expect at least one DL bandwidth part and one UL bandwidth part being active among the set of configured bandwidth parts for a given time instant. In some cases, a UE is only assumed to receive/transmit within active DL/UL bandwidth part(s) using the associated numerology.

With respect to single-carrier operation, in an example, a UE is not required to receive any DL signals outside a frequency range that is configured to the UE.

In an example in which there is one active DL bandwidth part for a given time instant, the configuration of a DL bandwidth part may include at least one CORESET. In some cases, a UE can assume that the PDSCH and the corresponding PDCCH (PDCCH carrying scheduling assignment for the PDSCH) are transmitted within the same bandwidth part (BWP) if, for example, the PDSCH transmission starts no later than K symbols after the end of the PDCCH transmission. In an example case of the PDSCH transmission starting more than K symbols after the end of the corresponding PDCCH, in some cases, the PDCCH and PDSCH may be transmitted in different BWPs.

With respect to the indication of active DL/UL bandwidth part(s) to a UE, the indication may be received via, for example and without limitation, the DI (explicitly and/or implicitly), a MAC control element (CE), a time pattern (e.g., DRX like), or a combination thereof.

With respect to component carriers activation and deactivation, activation/deactivation may be supported for NR CA. Activation/deactivation may be controlled per CC by explicit indication and implicit mechanism for NR CA. Configuration of implicit deactivation mechanism may be per CC for NR CA.

In LTE, the transmission time interval (TTI) is defined as having a fixed duration of the same value (e.g., 1 ms) for both UL and DL. The TTI duration, which may also be referred to as the TTI length, in some cases, is the smallest periodicity of scheduling occasions (PDCCH monitoring period). In an example in which UL scheduling is dynamic, the network can signal, to the UE, scheduling grant information every TTI. In an example in which resource allocation is semi-static, such as Semi-Persistent Scheduling (SPS) for example, the UL scheduling opportunity periodicity may be larger than a TTI duration, for example, because the network can reduce scheduling overhead by providing the UE, through semi-static signaling (e.g., RRC signaling), a scheduling grant with an indication that the scheduling grant applies every nth subframe (e.g., until further notice). In some cases, once configured through RRC signaling, the SPS scheduling grant may be activated or de-activated with (E)PDCCH signaling using the SPS C-RNTI. In LTE, the PDCCH monitoring period and UL transmission time interval are the same. Similarly, the PDCCH monitoring period and DL transmission time interval are the same.

Table 1 below shows example NR numerologies with their example key parameters. As shown, in some examples, there is a proportional relationship between the duration of symbols and the duration of slots (or mini-slots) of the numerologies.

TABLE 1

Example relationships between durations of symbols and slots (or mini-slots) across example NR numerologies

| Numerology $\mu$ | $\Delta f = 2^\mu \cdot 15[kHz]$ | Cyclic prefix | Symbol duration (µs) | Symbol + CP (µs) | $N^{slot}_{symb}$ | Slot duration (µs) | Slot duration + CP (µs) | Mini-Slot |
|---|---|---|---|---|---|---|---|---|
| 0 | 15 | Normal | 66.67 (1/1) | 71.43 | 14 | 933.33 (1/1) | 1000 | Configurable number of symbols, potentially more than one mini-slot configuration per numerology |

TABLE 1-continued

Example relationships between durations of symbols and slots (or mini-slots) across example NR numerologies

| Numerology $\mu$ | $\Delta f = 2^\mu \cdot 15[\text{kHz}]$ | Cyclic prefix | Symbol duration ($\mu s$) | Symbol + CP ($\mu s$) | $N^{slot}_{symb}$ | Slot duration ($\mu s$) | Slot duration + CP ($\mu s$) | Mini-Slot |
|---|---|---|---|---|---|---|---|---|
| 1 | 30 | Normal | 33.33 (1/2) | 35.71 | 14 | 466.67 (1/2) | 500 | Configurable number of symbols, potentially more than one mini-slot configuration per numerology |
| 2 | 60 | Normal, Extended | 16.67 (1/4) | 17.86 | 14 | 233.33 (1/4) | 250 | Configurable number of symbols, potentially more than one mini-slot configuration per numerology |
| 3 | 120 | Normal | 8.33 (1/8) | 8.93 | 14 | 116.67 (1/8) | 125 | Configurable number of symbols, potentially more than one mini-slot configuration per numerology |
| 4 | 240 | Normal | 4.17 (1/16) | 4.46 | 14 | 58.33 (1/16) | 62.5 | Configurable number of symbols, potentially more than one mini-slot configuration per numerology |
| 5 | 480 | Normal | 2.08 (1/32) | 2.23 | 14 | 29.17 (1/32) | 31.25 | Configurable number of symbols, potentially more than one mini-slot configuration per numerology |

In Table 1 (above), Table 2 (below), and Table 3 (below) the parameter $N_{symb}^{slot}$ represents the number of OFDM symbols per slot; the parameter $N_{slot}^{frame,\mu}$ represents the number of slots per radio frame, and the parameter $N_{slot}^{subframe,\mu}$ represents the number of slots per radio subframe.

TABLE 2

Example Number of OFDM symbols per slot ($N_{symb}^{slot}$) for normal cyclic prefix

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

Example Number of OFDM symbols per slot ($N_{slot}^{symb,\mu}$) for extended cyclic prefix

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In LTE, DRX operation is based on transmission and reception, which are Omni-directional or sectional. In NR, beamforming based uplink and downlink transmission are adopted, and it is recognized herein that beamforming may impact DRX operation. For example, beam recovery or beam switching may happen during DRX on duration and subsequent active time. NR may use a beam diversity PDCCH scheme, in which a UE may receive multiple PDCCHs on different beam pair links within one TTI. Therefore, embodiments described herein include DRX operations that address impacts of beamforming to current DRX operations.

In LTE, the DRX procedures is based on monitoring a PDCCH that is a single-stage PDCCH, and its physical resources are mapped across the cell bandwidth. It is recognized herein, however, that a 2-stage NR-PDCCH structure may be used in NR, where a UE monitors a common DL control channel first, then a secondary NR-PDCCH for a specific UE. In NR, NR-PDCCH may mapped to a sub-band within a bandwidth part, instead of being spanned over the entire cell bandwidth as in LTE. It is recognized herein that the new NR-PDCCH may affect the downlink control channel monitoring in DRX operations. Therefore, DRX embodiments described herein address the impact of new NR-PDCCH to DRX operations.

In NR, it is recognized herein that multiple DRX configurations may be supported, and L1/2 signaling (such as MAC CE based) can be used for dynamic DRX configuration switching. Embodiments described herein include signaling and other mechanisms that support multiple DRX configurations, and switching between multiple configurations.

In LTE, synchronous HARQ is used in the uplink, and both UL and DL HARQ have fixed timing for ACK/NACK. In NR, asynchronous HARQ can be used in UL, and both UL and DL HARQ can have variable timing for ACK/NACK. Therefore, embodiments described below include DRX operations that address the impact of HARQ design in NR to DRX operations.

In order to better serve different use cases and services with different QoS requirements, multiple SR configurations may be allowed in NR. Therefore, embodiments described below further include DRX operations that address the impact of multiple SR configurations in NR to DRX operation.

Figure 25:
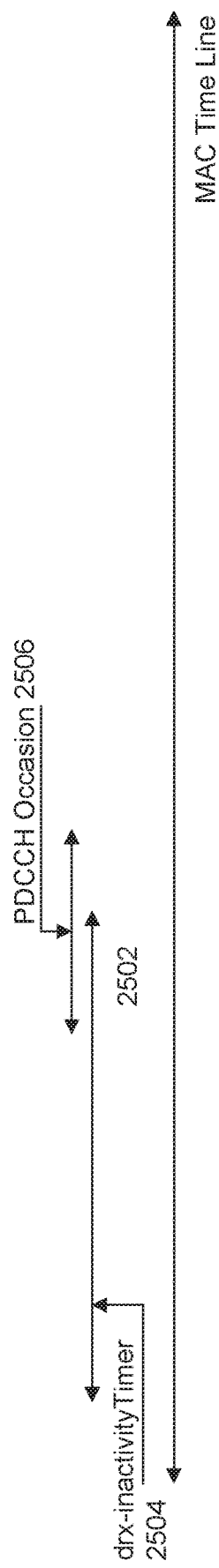
FIG. 25 depicts an example scenario in which a DRX inactivity timer overlaps with a Physical Downlink Control Channel (PDCCH) occasion.

The current NR radio resource control (RRC) specification 38.331 V15.0.0 defines the unit of drx-onDurationTimer and drx-InactivityTimer in milliseconds (ms). Referring to FIG. 24, an example DRX configuration information element is depicted. In accordance with the illustrated example, the drx-onDurationTimer is, for instance can only be, an integer number of milliseconds when it has a value of one millisecond or more. Similarly, in some cases, the drx-InactivityTimer can only be an integer number of milliseconds. An example PDCCH occasion, as specified in 38.331 V15.0.0, is a time duration (e.g., one or a plurality of a consecutive number of symbols) during which the MAC entity is configured to monitor the PDCCH. A parameter drx-SlotOffset can indicate a delay in slots before starting the drx-onDurationTimer. This offset may have the effect of aligning the start of the drx-onDurationTimer with a PDCCH occasion. In some cases, however, the end of the drx-onDurationTimer can at least partially overlap with a PDCCH monitoring occasion. It is recognized herein that the scheduler may need to know whether a PDCCH occasion is the last PDCCH occasion or not. Similarly, in some cases, the end of the drx-InactivityTimer can at least partially overlap with a PDCCH occasion, as illustrated in FIG. 25. For example, as shown, an end 2502 of a drx-Inactivity timer 2504 can overlap with respect to time with a PDCCH occasion 2506. Thus, it is also recognized herein that the scheduler may need to know whether a PDCCH occasion is the last PDCCH occasion or not.

Turning first to redefining the TTI in LTE as an NR time unit for DRX operations, in NR, as in LTE, the TTI may also be considered as the time duration between consecutive data transmission occasions. For example, data transmission occasion may have respective start times that are separated from each other by the TTI. As illustrated in Table 1, the time durations (e.g., in microseconds) of a slot or a mini-slot can be numerology specific, and thus can vary with the numerology, while maintaining a proportional relationship across numerologies. In some cases, there may be more than one mini-slot configuration per numerology in terms of number of symbols within the mini-slot. Therefore, a numerology may have more than one TTI, for instance, each with a different time duration (e.g., in microseconds or milliseconds). In example cases in which slot level scheduling and mini-slot level scheduling are supported by NR systems, and in cases in which the gNB can schedule data transmissions to the same UE at slot level or mini-slot level within the same numerology or over more than one numerology, the data transmission timer interval (e.g., the time duration between consecutive data transmission occasions) can be variable. In some examples, in order to have a fixed time duration TTI, for example to support MAC, a UE-specific TTI is disclosed herein. The UE specific TTI, which can be denoted as TTI*, may have a fixed time duration, and may be referred to as the basic NR time unit (NR-UNIT) for MAC procedures. As used herein, unless otherwise specified, TTI* refers to a fixed basic NR time unit of a fixed duration, as opposed to numerology specific variable TTI(s). As used herein, unless otherwise specified, NR-UNIT, processor interrupt time unit, and TTI*may be used interchangeably, without limitation. Furthermore, unless explicitly stated, NR-UNIT, processor interrupt time unit, TTI*, and TTI may be used interchangeably below, without limitation.

In some examples, because of the proportional relationship between the durations of symbols, mini-slots, or slots in NR systems, the time intervals between consecutive transmission opportunities may also be proportional to one another. For example, the time interval between two consecutive transmission opportunities may therefore be a multiple of the smallest of the slot durations with which the UE is configured, assuming slot level scheduling of the UE. Similarly, in some cases, the time interval between consecutive transmission opportunities may be a multiple of the smallest of the mini-slot durations with which the UE is configured, assuming mini-slot and slot level scheduling of the UE. Consequently, in accordance with an example, the NR-UNIT (TTI*) may be, without limitation, the smallest of the possible slot (or mini-slot) duration that can be supported by the UE for slot level scheduling (or mini-slot level scheduling), as per the UE Capability. The UE may also take into account other information such as the UE battery level, device category, power saving mode setting, etc.

In accordance with another example, the NR-UNIT (TTI* or processor interrupt time unit) may be the smallest of the possible slot (or mini-slot) durations across the numerologies with which the UE is configured. The configuration may be static or through semi-static RRC signaling.

In accordance with another example, the NR-UNIT (TTI* or processor interrupt time unit) may be the smallest of the possible slot (or mini-slot) durations across the bandwidth parts (BWPs) with which the UE is configured. The configuration may be static or through semi-static RRC signaling.

In accordance with another example, the NR-UNIT (TTI* or processor interrupt time unit) may be the slot (or mini-slot) duration that may be used as the minimum time interval between UL transmission (e.g., PUSCH, PUCCH or either PUSCH or PUCCH) occasions, or that may be used as the minimum time interval between DL reception (e.g., PDSCH, PDCCH or either PDSCH or PDCCH) occasions, as signaled to the UE by the gNB.

In accordance with another example, the NR-UNIT (TTI* or processor interrupt time unit) may be the smallest of the slot (respectively mini-slot) durations taken across the active numerologies, wherein an active numerology is defined as an activated numerology among the configured numerologies, and wherein the UE may expect to perform UL transmission (e.g., PUSCH, PUCCH or either PUSCH or PUCCH) or DL reception (e.g., PDSCH, PDCCH or either PDSCH or PDCCH). The UE may determine the active numerologies, for instance, numerologies where it may expect to perform UL transmission or DL reception, through configuration signaling from the gNB. The configuration signaling may be one or more of semi static RRC signaling, MAC signaling (e.g., Random Access Response) or DCI signaling, for example.

In accordance with another example, the NR-UNIT (TTI* or processor interrupt time unit) may be the smallest of the slot (or mini-slot) durations taken across the activated UL BWPs or DL BWPs. The UE can be configured with activated DL BWPs by a higher layer parameter [activated-DL-BWP], where the parameter [activated-DL-BWP] defines a DL BWP subset from a configured DL BWP set for DL reception. Similarly, the UE can be configured with activated UL BWPs by a higher layer parameter [activated-UL-BWP], where the parameter [activated-UL-BWP] defines an UL BWP subset from a configured UL BWP set for UL transmissions.

In accordance with another example, the NR-UNIT (TTI* or processor interrupt time unit) may be the slot (or mini-slot) duration of a reference or default numerology.

Furthermore, in some cases, the NR-UNIT may be defined with respect to UL transmission, or with respect to DL direction. With respect to UL direction, the NR-UNIT may be, presented by way of example and without limitation the smallest of the possible slot (or mini-slot) duration that can be supported by the UE for slot level UL scheduling (respectively mini-slot level UL scheduling), as per the UE Capability. The UE may also take into account other information such as the UE battery level, device category, power saving mode setting, etc.

In accordance with the another example, with respect to UL direction, the NR-UNIT or processor interrupt time unit may be the smallest of the possible slot (or mini-slot) durations across the UL numerologies with which the UE is configured. The configuration may be static or through semi-static RRC signaling.

In accordance with the another example, with respect to UL direction, the NR-UNIT or processor interrupt time unit may be the smallest of the possible slot (or mini-slot) durations across the UL BWPs with which the UE is configured. The configuration may be static or through semi-static RRC signaling.

In another example, the slot (or mini-slot) duration that may be used as the minimum time interval between UL transmission (e.g., PUSCH, PUCCH or either PUSCH or PUCCH) occasions, as may be signaled to the UE by the gNB.

In accordance with the another example, with respect to UL direction, the NR-UNIT or processor interrupt time unit may be the smallest of the slot (or mini-slot) durations taken across the active UL numerologies, where an active UL numerology is defined as an activated UL numerology among the configured UL numerologies, where the UE may expect to perform UL transmission (e.g., PUSCH, PUCCH or either PUSCH or PUCCH). The UE may determine the active UL numerologies, for instance the numerologies where it may expect to perform UL transmission, through configuration signaling from gNB. The configuration signaling may be one or more of semi static RRC signaling, MAC signaling (e.g., Random Access Response), or DCI signaling, for example.

In accordance with the another example, with respect to UL direction, the NR-UNIT or processor interrupt time unit may be the smallest of the slot (or mini-slot) durations taken across the activated UL BWPs. The UE can be configured with activated UL BWPs by a higher layer parameter [activated-UL-BWP], where the parameter activated-UL-BWP] defines an UL BWP subset from a configured UL BWP set for UL transmissions.

In accordance with the another example, with respect to UL direction, the NR-UNIT or processor interrupt time unit may be the slot (or mini-slot) duration of a reference or default numerology, for example a reference or default UL numerology.

With respect to DL direction, NR-UNIT or processor interrupt time unit may be, for example and without limitation, the smallest of the possible slot (or mini-slot) duration that can be supported by the UE for slot level DL scheduling (or mini-slot level DL scheduling), as per the UE Capability. The UE may also take into account other information such as the UE battery level, device category, power saving mode setting, etc.

In accordance with another example, with respect to DL direction, the NR-UNIT or processor interrupt time unit may be the smallest of the possible slot (or mini-slot) durations across the DL numerologies with which the UE is configured. The configuration may be static or through semi-static RRC signaling.

In accordance with another example, with respect to DL direction, the NR-UNIT or processor interrupt time unit may be the smallest of the possible slot (or mini-slot) durations across the DL BWPs with which the UE is configured. The configuration may be static or through semi-static RRC signaling.

In accordance with another example, with respect to DL direction, the NR-UNIT or processor interrupt time unit may be the slot (or mini-slot) duration that may be used as the minimum time interval between DL reception (e.g., PDSCH, PDCCH or either PDSCH or PDCCH) occasions, as signaled to the UE by the gNB.

In accordance with another example, with respect to DL direction, the NR-UNIT or processor interrupt time unit may be the smallest of the slot (or mini-slot) durations taken across the active DL numerologies, wherein an active DL numerology is defined as an activated DL numerology among the configured DL numerologies, and wherein the UE may expect to perform DL reception (e.g., PDSCH, PDCCH or either PDSCH or PDCCH). The UE may determine the active DL numerologies, for instance the numerologies where it may expect to perform DL transmission, through configuration signaling from gNB. The configuration signaling may be one or more of semi static RRC signaling, MAC signaling (e.g. Random Access Response), or DCI signaling, for example.

In accordance with another example, with respect to DL direction, the NR-UNIT or processor interrupt time unit may be the smallest of the slot (or mini-slot) durations taken across the activated DL BWPs. The UE can be configured with activated DL BWPs by a higher layer parameter [activated-DL-BWP], wherein the parameter [activated-DL-BWP] defines a DL BWP subset from a configured DL BWP set for DL reception.

In accordance with another example, with respect to DL direction, the NR-UNIT or processor interrupt time unit may be the slot (or mini-slot) duration of a reference or default numerology, for example a reference or default DL numerology.

In some cases, regardless of how the NR-UNIT or TTI* or processor interrupt time unit is defined (e.g., see above), the NR-UNIT may be expressed or configured in the UE as an integer number of OFDM symbols. The duration of the symbol (e.g., milliseconds or microseconds) in that case may depend on which definition of NR-UNIT among the above is used.

For convenience, as used herein, unless otherwise specified, the definition of NR-UNIT (TTI* or processor interrupt time unit) is irrespective of the transmission direction. In some cases, the NR-UNIT or processor interrupt time unit may be fixed and may be updated over time. For example, if a numerology or respective BWP with the smallest minislot or slot duration is deactivated, or removed from the configured numerology set or BWP set of the UE, the NR-UNI may be updated. In some cases, such an update might be beneficial, for example, in terms of power saving and battery life enhancement. For example, a given UE might operate at a higher time granularity, which implies that the UE context (e.g., protocol variables and counters) can be updated with less frequency.

In an example NR system, for each serving cell, higher layer signaling configures a UE with Q control resource sets. For an example control resource set in which $0 \leq q < Q$, the configuration may include a first OFDM symbol provided by a higher layer parameter [CORESET-start-symb], and a number of consecutive OFDM symbols provided by a higher layer parameter [CORESET-time-duration].

In non-DRX mode operation, a UE may monitor PDCCH candidates in control resource set q according to a periodicity of $W_{PDCCH,q}$ symbols, which is configured by a higher layer parameter [CORESET-monitor-period] for control resource set q. For a given PDCCH type (e.g., common PDCCH or UE specific PDCCH), the PDCCH monitoring period or PDCCH period may be defined as the time interval between the starts of two consecutive PDCCH occasions. A PDCCH occasion may refer to the start of a CORESET, and may be defined by the parameters [CORESET-start-symb], for example the first symbol of the control resource set of the PDCCH. The PDCCP Period of a PDCCH type (e.g., common PDCCH or UE specific PDCCH) may therefore also be expressed in unit of NR-UNIT (TTI*) duration as defined herein. Similarly, the parameter CORESET-time-duration may be expressed in unit of NR-UNIT (TTI*) duration as defined herein.

In accordance with another example, PDCCH-(NR-UNIT) is defined, which can also be referred to as PDCCH-TTI* or PDCCH-TTI, which contains the first OFDM symbol of a PDCCH. Currently, downlink and uplink transmissions are organized into frames of 10 ms durations, consisting of ten subframes each having a 1 ms duration. A system frame number (SFN) can be expressed as a number of PDCCH monitoring periods (PDCCH period) or as a number of NR-UNIT. Furthermore, in an example, it is assumed that a subframe can be expressed in a number of PDCCH monitoring periods (PDCCH period) or in a number of NR-UNIT. In an example, a radio subframe can consist of X NR-UNITs, where X is an integer. This may be possible because of the proportionality relationship between NR time slot (or mini-slot) durations across NR numerologies, and because the NR time slots (or mini-slots) may consist of an integer number of OFDM symbols. A radio frame then may include 10×NR-UNITs.

Similar to the above description regarding the transmission time interval (TTI) that which can be variable in NR, the PDCCH monitoring period also may be variable. However, as a result of the proportionality relationship between NR time slot (or mini-slot) durations across NR numerologies, and because the NR time slots or mini-slot consist of an integer number of OFDM symbols, the PDCCH monitoring period (or simply PDCCH period) can, for instance always, be expressed as an integer number (multiple) of NR-UNIT or processor interrupt time unit. As used herein, unless otherwise specified, PDCCH monitoring period, PDCCH period, or PDCCH monitoring occasion may be used interchangeably, without limitation.

Turning now to impacts of beamforming to current DRX operations, in particular DRX with beam failure recovery, in an example beam failure criteria is defined as when the quality of beam pair link(s) of an associated control channel becomes lower than a threshold. When beam failure criteria are met at the UE, the beam failure reporting (and recovery) may be triggered. A beam failure report (BFR) may be used for reporting the beam failure to the network, and potential beam training to find a new beam pair link.

In some cases, when a beam failure procedure is triggered at the UE, it will send a beam recovery request (BRR) in the uplink, and wait for gNB/network's response in the DL within a predefined brr-ResponseWindowTimer. For example, an apparatus (UE) may transmit a beam failure recovery request during an active time of the apparatus, and wait for a response to the beam recovery request during the active time. In some cases, the beam failure recovery may even suspend other UL/DL transmissions until it is completed, thereby impacting DRX procedures. For example, the apparatus can suspend one or more DRX timers during a beam failure recovery, and resume the one or more DRX timers when the beam failure recovery is complete. As used herein, unless otherwise specified, a beam failure report (BFR) denotes the reporting of a beam failure scenario that does not require the initiation of a beam recovery procedure. This might be the case when a BPL fails but the UE still has other operational BPLs (e.g., BPL with quality above a threshold), and therefore the radio link can be maintained. As used herein, unless otherwise specified, a beam recovery request (BRR) denotes the reporting of a beam failure that may require the initiation of a beam recovery procedure. An example of such a scenario may be the case where a beam failure is detected at the UE and there is no other operational BPL (e.g., BPL with quality above a threshold) available, or the radio link cannot be maintained without beam recovery.

To accommodate a beam failure recovery's impact, in an example, when a UE transmits a BRR on its configured UL transmission/resources, a brr-Response Window Timer will be started. The DRX Active time may include such a response window. In an example, other UL/DL transmissions except BRR and BRR responses may be suspended until the beam failure recovery procedure is completed. And their corresponding timers (such as drx-Retransmission-Timer, drx-ULRetransmissionTimer, drx-InactivityTimer, onDurationTimer) may be resumed or reset upon the completion of the beam failure recovery procedure.

With respect to DRX with Beam Diversity PDCCH, in order to increase robustness against beam pair link blocking, for example, a beam diversity PDCCH scheme may be used where a UE can be configured to monitor NR-PDCCH on different beam pair link(s) in different NR-PDCCH OFDM symbols. The BPL that the UE monitors with the highest duty cycle is defined as the primary BPL. In an example, for a UE using beam diversity PDCCH scheme, a PDCCH bundle occasion is defined herein as the time unit containing OFDM symbols, where UEs are configured to monitor PDCCHs on several different BPLs. As used herein, a BPL specific PDCCH occasion or an unbundled PDCCH occasion refers to the time unit containing the OFDM symbols, wherein a given UE is configured to monitor PDCCH on specific BPL. In an example, a given UE waits until the end of the PDCCH bundle occasion make a joint decision based on all valid PDCCHs received in the PDCCH bundle occasion to perform its UL/DL transmission and reception procedures. In an example, the MAC entity monitors PDCCH based on PDCCH bundle occasions. Further, when using DRX, the MAC entity may also monitor PDCCH based on PDCCH bundle occasions.

In some cases, if the UE detects the PDCCH on the primary BPL successfully, it will perform its UL/DL transmission and reception procedures according to the DCI in this PDCCH. If the PDCCH on the primary BPL is not decoded successfully, the UE may wait until the end of PDCCH bundle occasion and make a joint decision based on the valid PDCCHs received in the PDCCH bundle occasion, or use the first successfully decoded PDCCH, and will start DRX timers accordingly. Here, the MAC entity may monitor the PDCCH based on the primary BPL specific PDCCH occasions. During a given PDCCH bundle occasion, for instance if (e.g., only if) the primary BPL specific PDCCH occasion is not decoded successfully, the MAC entity monitors PDCCH based on the PDCCH bundle occasion. Further, when using DRX, the MAC entity may also monitor PDCCH based on the primary BPL specific PDCCH occasions and, if the primary BPL specific PDCCH occasion is not decoded successfully, the MAC entity may monitor the PDCCH based on the PDCCH bundle occasion.

In an example, the UE may use the first successfully decoded PDCCH within a PDCCH bundle occasion to perform its UL/DL transmission and reception procedures. The MAC entity may monitor the PDCCH based on the first successfully decoded PDCCH within a PDCCH bundle occasion. In some examples, when using DRX, the MAC entity may also monitor the PDCCH based on the first successfully decoded PDCCH within a PDCCH bundle occasion.

In some examples, the RRC controls DRX operation by configuring the timers defined herein: drx-onDuration Timer, drx-Inactivity Timer, drx-Retransmission Timer, ULRetransmissionTimer, the drx-LongCycle, the value of drxStartOffset, and optionally the drxShortCycleTimer and shortDRX-Cycle. A HARQ RTT timer per DL HARQ process (except for the broadcast process) and UL HARQ RTT Timer per UL HARQ process may also be configured.

In some cases, when a DRX cycle is configured, the Active Time includes the time while, for example, 1) onDurationTimer or drx-InactivityTimer or drx-Retransmission Timer or drx-ULRetransmissionTimer or mac-ContentionResolution Timer is running; or 2) a Scheduling Request or Beam Recovery Request is sent on PUCCH and is pending; or 3) an uplink grant for a pending HARQ retransmission can occur and there is data in the corresponding HARQ buffer for synchronous HARQ process; or 4) a PDCCH indicating a new transmission addressed to the C-RNTI of the MAC entity has not been received after successful reception of a Random Access Response for the preamble not selected by the MAC entity; or 5) a Beam Recovery Request is sent on PRACH and is pending, which may be equivalent to the brr-Response Window Timer running.

In an example, when DRX is configured, a MAC entity may, for each TTI:
if a HARQ RTT Timer expires in a given TTI:
  if the data of the corresponding HARQ process was not successfully decoded:
    start the drx-RetransmissionTimer for the corresponding HARQ process
  if NB-IoT, start or restart the drx-InactivityTimer
if an UL HARQ RTT Timer expires in this TTI:
  start the drx-ULRetransmissionTimer for the corresponding HARQ process
  if NB-IoT, start or restart the drx-InactivityTimer.
if a Beam recovery request is sent on UL resources (PUCCH or PRACH) in this TTI:
  may suspend one or several of other running timers, if any, such as drx-RetransmissionTimer, drx-ULRetransmissionTimer, drx-InactivityTimer, onDurationTimer. In an alternative example, suspend all running DRX timers (e.g., drx-onDuration Timer, drx-Inactivity Timer, drx-Retransmission Timer, ULRetransmissionTimer, drxShortCycle Timer, HARQ RTT timer per DL HARQ process and UL HARQ RTT Timer per UL HARQ).
  start the brr-Response Window Timer for the corresponding beam pair link.
if a DRX Command MAC control element or a Long DRX Command MAC control element is received:
  stop onDurationTimer;
  stop drx-InactivityTimer.
if the drx-InactivityTimer expires or a DRX Command MAC control element is received in this TTI:
  if the Short DRX cycle is configured:
    start or restart drxShortCycleTimer;
    use the Short DRX Cycle.
  else:
    use the Long DRX cycle.
if drxShortCycleTimer expires in this TTI:
  use the Long DRX cycle.
if a Long DRX Command MAC control element is received:
  stop drxShortCycleTimer;
  use the Long DRX cycle.
if the Short DRX Cycle is used and [(SFN*10x)+TTI number] modulo (shortDRX-Cycle)=(drxStartOffset) modulo (shortDRX-Cycle), where X is the number of TTI in a radio subframe; or
if the Long DRX Cycle is used and [(SFN*10)+subframe number] modulo (longDRX-Cycle)=drxStartOffset, where X is the number of TTI in a radio subframe:
  if NB-IoT:
    if there is at least one HARQ process for which neither HARQ RTT Timer nor UL HARQ RTT Timer is running, start onDurationTimer.
  else:
    start onDurationTimer.
during the Active Time, for a PDCCH-TTI, if the TTI is not required for uplink transmission for half-duplex FDD UE operation, and if the TTI is not a half-duplex guard TTI, and if the TTI is not part of a configured measurement gap and if the TTI is not part of a configured Sidelink Discovery Gap for Reception, and for NB-IoT if the TTI is not required for uplink transmission or downlink reception other than on PDCCH; or
during the Active Time, for a TTI other than a PDCCH-TTI and for a UE capable of simultaneous reception and transmission in the aggregated cells, if the TTI is a downlink TTI indicated by a valid eIMTA L1 signaling for at least one serving cell not configured with schedulingCellId and if the TTI is not part of a configured measurement gap and if the TTI is not part of a configured Sidelink Discovery Gap for Reception; or
during the Active Time, for a TTI other than a PDCCH-TTI and for a UE not capable of simultaneous reception and transmission in the aggregated cells, if the TTI is a downlink TTI indicated by a valid eIMTA L1 signaling for the SpCell and if the TTI is not part of a configured measurement gap and if the TTI is not part of a configured Sidelink Discovery Gap for Reception:
  monitor the PDCCH;
  if the PDCCH or the PDCCH indicates a DL transmission or if a DL assignment has been configured for this TTI; if beam diversity PDCCH scheme is used, several PDCCHs indicating a DL transmission can be detected in the same TTI (but different OFDM symbols from different beam pair links). Depending on the rules of UE processing of PDCCHs received within a PDCCH bundle occasion (as described herein) being used, one PDCCH out of several PDCCHs received within a PDCCH bundle occasion may be used:
    if the UE is an NB-IoT UE, a BL UE or a UE in enhanced coverage:
      start the HARQ RTT Timer for the corresponding HARQ process in the TTI containing the last repetition of the corresponding PDSCH reception;
    else:
      start the HARQ RTT Timer for the corresponding HARQ process;
    stop the drx-RetransmissionTimer for the corresponding HARQ process.

if NB-IoT, stop drx-ULRetransmissionTimer for all UL HARQ processes.
if the PDCCH indicates an UL transmission for an asynchronous HARQ process or if an UL grant has been configured for an asynchronous HARQ process for this TTI:
start the UL HARQ RTT Timer for the corresponding HARQ process in the TTI containing the last repetition of the corresponding PUSCH transmission;
stop the drx-ULRetransmissionTimer for the corresponding HARQ process.
if the PDCCH indicates a new transmission (DL, UL or SL):
except for a NB-IoT UE configured with a single DL and UL HARQ process, start or restart drx-InactivityTimer.
if the PDCCH indicates a transmission (DL, UL) for a NB-IoT UE:
if the NB-IoT UE is configured with a single DL and UL HARQ process:
stop drx-InactivityTimer.
stop onDurationTimer.
if the PDCCH indicates a response to a pending BRR for this TTI:
stop the brr-ResponseWindowTimer for the corresponding beam pair link;
resume DRX control timers, for instance all DRX control timers that were suspended following BRR transmission.
in current TTI n, if the MAC entity would not be in Active Time considering grants/assignments/DRX Command MAC control elements/Long DRX Command MAC control elements received and Scheduling Request sent until and including TTI n-5 when evaluating all DRX Active Time conditions as specified in this subclause, type-O-triggered SRS, in some cases, is not reported.
if CQI masking (cqi-Mask) is setup by upper layers:
in current TTI n, if onDurationTimer would not be running considering grants/assignments/DRX Command MAC control elements/Long DRX Command MAC control elements received until and including TTI n-5 when evaluating all DRX Active Time conditions as specified in this subclause, CQI/PMI/RI/PTI/CRI on PUCCH, in some cases, is not reported.
else:
in current TTI n, if the MAC entity would not be in Active Time considering grants/assignments/DRX Command MAC control elements/Long DRX Command MAC control elements received and Scheduling Request sent until and including TTI n-5 when evaluating all DRX Active Time conditions as specified in this subclause, CQI/PMI/RI/PTI/CRI on PUCCH, in some cases, is not reported.

In some cases, regardless of whether the MAC entity is monitoring PDCCH or not, the MAC entity receives and transmits HARQ feedback and transmits type-1-triggered SRS when such is expected. The MAC entity monitors PDCCH addressed to CC-RNTI for a PUSCH trigger B on the corresponding CC even if the MAC entity is not in Active Time, when such is expected.

Turning now to NR-PDCCH based DRX aspects, in one example, a DRX parameter is set per MAC entity, which may be complemented by the support of component carrier (CC) BWP activation or deactivation. The gNB may control the UE DRX using a single DRX configuration parameter set per MAC entity at a time, complemented by BandWidth Part (BWP) activation or deactivation within an activated CC. The UE may be configured with multiple DRX configuration parameter sets but, in some cases, only one set is in use at any given point in time. The activation or de-activation of BWP may trigger an update or a reselection of the DRX configuration parameter set for DRX control.

A single DRX configuration parameter set per MAC entity may consist of various parameters, presented by way of example and without limitation: an optional short on-duration timer (shortOnDurationTimer), a long on duration timer (which is also referred to herein as a regular on duration timer, or simply an on-duration timer (onDurationTimer)), an inactivity timer (drx-InactivityTimer), downlink DRX retransmission timer (drx-RetransmissionTimer, one per DL HARQ process), uplink DRX retransmission timer (drx-ULRetransmissionTimer, one per UL HARQ process), the long DRX cycle (longDRX-Cycle, the value of the DRX start offset (drxStartOffset), the DRX short cycle timer (drxShortCycleTimer), a short DRX cycle (shortDRX-cycle, a HARQ RTT timer per DL HARQ process, and an UL HARQ RTT timer per asynchronous UL HARQ process.

The short on-duration timer may be used for monitoring a "group common PDCCH," and the long on-duration timer may be used for monitoring the UE specific PDCCH. For example, when the UE determines through group common PDCCH that blind decoding of UE specific PDCCH may not be skipped, then the UE may monitor the UE specific PDCCH using the long on-duration timer. Alternatively, in some cases, the long on-duration timer may be used only when the network instructs the UE during the short on-duration period to use the long on-duration period at the next on-duration occasion. In aspect of DRX configuration, the component carriers of the same MAC entity may share the same set of DRX configuration parameters. For the example case of connectivity with more than one MAC entity, the DRX parameters may either be common (i.e. coordinated or synchronized) to all MAC entities, completely independent (i.e. uncoordinated or unsynchronized) between MAC entities, or partially common (i.e. partially coordinated or synchronized) between MAC entities. For example, in some cases, some of the DRX parameters are common while some others are not.

In an example, activation and deactivation of BandWitdh Part (BWP), in addition to activation and deactivation of CC, is supported. In an example, multiple BWPs with different numerologies on the same Component Carrier (CC) is supported. With dynamic activation and deactivation by the gNB of BWP within the same CC, and UE RF returning to match active BWPs, power saving can be achieved. The activation and deactivation of BWP may be modelled in MAC as, for example and without limitation, a DRX command MAC CE, or as a long DRX command MAC CE, or as CC Activation/deactivation command MAC CE. These modeling approaches have different impacts in terms of power saving. For example, the BWP activation and deactivation using DRX command modeling versus using CC activation/deactivation modeling differs in that, in the latter case, all transmissions (including the transmission of reference signals) in the BWP cease when the CC is deactivated and resume only when the BWP is activated again by the gNB. In contrast, in the former case (i.e. the DRX command case), this may be used to indicate to the UE that the BWP may not be considered in DRX conditions evaluation for the MAC entity. That is, the UE may consider that DRX rules do not apply for that BWP for the specified DRX cycle, and may not monitor PDCCH on that BWP in support of DRX operation. Furthermore, when an CC is configured through RRC signaling, the gNB in addition to configuring the UE with the BWPs that the CC is made of, may also indicate the subset of default BWPs that is activated when the CC is activated, or whether the full set of the BWPs is activated when the CC is activated. The activation or de-activation of BWP may require an update or a reselection of the active DRX configuration parameter set(s) for proper DRX control. For example, PDCCH configuration on a BWP may vary from one BWP to another, and may use different numerology from one BWP to another, or even possibly within the same BWP. Interaction between BWP activation and deactivation, or between CC activation and deactivation, is further discussed below.

In another example, RRC's control of DRX operation rely on sets, for instance two sets, of DRX configuration parameter sets per MAC entity. For example, one DRX parameter set can be for group common PDCCH monitoring and another DRX parameter set can be for UE specific PDCCH monitoring. The UE may be configured with multiple DRX configuration parameter sets but, in some cases, only two sets of parameters are considered active (in use) for the control of DRX procedures.

The gNB may control DRX using two DRX configuration sets per MAC entity: one configuration set for the discontinuous monitoring of group common PDCCH and the other DRX configuration set for the discontinuous monitoring of UE specific PDCCH. The UE may start by monitoring the group PDCH according to the group common PDCCH, then once the UE detects an upcoming UE specific PDCCH for the group common PDCCH based on the UE specific PDCCH scheduling information in the group common PDCCH, the UE may switch to using the DRX configuration set for the discontinuous monitoring of the UE specific PDCCH. Alternatively, or additionally, the gNB may explicitly command the UE, to either use the DRX parameters set configured for the group common PDCCH DRX monitoring or use the DRX parameters configured for the monitoring of dedicated PDCCH DRX monitoring. The gNB may configure the UE with the two set of DRX configuration parameters using RRC dedicated signaling, for example, as part of the RRC reconfiguration message. In one embodiment, upon successfully completing the RRC reconfiguration procedure, the UE may start using the DRX configuration parameters set configured for the monitoring of the group common PDCCH. Upon the UE detecting the command to perform blind decoding of UE specific PDCCH, in some cases, the UE transitions to using the DRX configuration parameters the UE is configured with. Additionally or alternatively, the gNB may command the UE through MAC CE signaling or PHY DCI signaling, to use DRX configuration parameters associated with group common PDCCH, or to use the DRX configuration parameters associated with the UE specific PDCCH.

In this example of DRX configuration, the component carriers of the same MAC entity may share the same two sets of DRX configuration parameters. For example, the two sets of DRX configuration parameters may be common to the component carriers (CC) of the same MAC entity. For an example case of connectivity with more than one MAC entity, the two sets of DRX parameters may be common to all MAC entities (i.e. coordinated or synchronized), completely independent (i.e. uncoordinated or unsynchronized) between the MAC entities, or partially common (i.e. partially coordinated or synchronized) between the MAC entities. For example, some of the DRX parameters are common while some others are not.

In another example, DRX uses multiple DRX configurations. The gNB may control DRX using multiple DRX configuration sets per MAC entity with one or more configuration sets active at a time. For example, the gNB may configure the UE through RRC signaling with more than one set of DRX configuration parameters. The gNB may then use a MAC CE to activate or deactivate one or more set of DRX configuration parameter sets. In this example of DRX configuration, the MAC configuration parameters may be common to all MAC (i.e. coordinated or synchronized), completely independent (i.e. uncoordinated or unsynchronized) between the MAC entities or between the component carriers or between numerologies of the same component carriers, or partially common (i.e. partially coordinated or synchronized) between the MAC entities or between the component carriers or between the numerologies of the same component carriers (i.e. some of the DRX parameters are common while some others are not).

Turning now to DRX configurations in support of various DRX embodiments described herein, multiple DRX configurations can be utilized in NR to better serve different use cases' trade-offs between power savings and latency. In an example, a single DRX configuration per MAC entity has various parameters, such as, for example and without limitation:

A shortOnDurationTimer: duration that the UE waits for, after waking up from DRX, to receive common group PDCCHs. If the UE successfully decodes a group common PDCCH addressed to the UE (e.g., a group common PDCCH masked by a group RNTI assigned to the UE), and the group common PDCCH orders the UE to perform blind UE specific PDCCH decoding, the UE stays awake and switches to using the long on-duration timer (e.g., OnDurationTimer) for the monitoring of the UE specific PDCCH. In one embodiment, when the UE switches from using shortOnDurationTimer for common group PDCCH monitoring to using UE specific OnDurationTimer for UE specific PDCCH monitoring, the UE sets the OnDurationTimer duration to OnDurationTimer-shortOnDurationTimer, then on subsequent monitoring of the UE specific PDCCH, the UE sets the OnDurationTimer to its full duration as configured by RRC for e.g. in the MAC-MainConfig information element. In another embodiment, when the UE switches from using shortOnDurationTimer for common group PDCCH monitoring to using UE specific OnDurationTimer for UE specific PDCCH monitoring, the UE sets the OnDurationTimer to its full duration as configured by RRC (for e.g. in the MAC-MainConfig information element). The value of the shortOndurationTimer duration may be expressed in number of consecutive group common PDCCH monitoring period(s) (i.e. a number that is a multiple of group_common_pdcch_monitor_period). The shortOnDurationTimer may therefore be defined as the duration in number of consecutive common PDCCH monitoring periods that the UE waits for, after waking up from DRX, to receive common group PDCCHs. In an alternative embodiment, the value of the shortOnDurationTimer may be expressed in unit of subframe. In yet another embodiment, the value of the shortOnDurationTimer may be expressed in absolute time for e.g. in millisecond or microsecond. Furthermore, the value of the shortOndurationTimer duration may be expressed in number of consecutive TTIs where TTI is as defined above. As also described above, PDCCH monitoring period, PDCCH period, and PDCCH monitoring occasion can be used interchangeably herein, without limitation, unless otherwise specified. The parameter shortOndurationTimer may also be referred to as shortOnDurationCounter. Both shortOnduration-Timer and shortOnDurationCounter terms be used interchangeably herein without limitation, unless otherwise specified.

An OnDurationTimer: duration that the UE waits for, after waking up from DRX, to receive UE specific PDCCHs. In some cases, if the UE successfully decodes a PDCCH, the UE stays awake and starts the inactivity timer. The value of the OndurationTimer duration may be expressed, for example, in number of UE consecutive specific PDCCH monitoring period(s) (i.e. a number that is a multiple of pdcch_monitor_period). The OnDurationTimer may therefore be defined as the duration in number of consecutive PDCCH monitoring period(s) that the UE waits for, after waking up from DRX, to receive UE specific PDCCHs. In an alternative embodiment, the value of the OnDurationTimer may be expressed in unit of subframe. In yet another embodiment, the value of the OnDurationTimer may be expressed in absolute time for e.g. in millisecond or microsecond. Furthermore, the value of the OndurationTimer duration may also be expressed in number of consecutive TTIs, where TTI is as defined above. As also described above, PDCCH monitoring period, PDCCH period, and PDCCH monitoring occasion may be used interchangeably herein, without limitation, unless otherwise specified. The parameter Onduration-Timer may also be referred to as the OnDuration-Counter. Both OndurationTimer and OnDuration-Counter terms may be used interchangeably herein without limitation, unless otherwise specified.

A drx-InactivityTimer: duration in number of consecutive PDCCH monitoring period(s) that the UE waits to successfully decode a PDCCH, from the last successful decoding of a PDCCH, failing which it re-enters DRX. More specifically, the drx-InactivityTimer may specify the number of consecutive PDCCH monitoring occasion(s) after the PDCCH monitoring occasion in which a PDCCH indicates an initial UL, DL or SL user data transmission for this MAC entity. The UE may restart the inactivity timer following a single successful decoding of a PDCCH for a first transmission only, in some cases (i.e. not for retransmissions). In an alternative embodiment, the drx-InactivityTimer duration may be expressed in unit of subframe. In yet another embodiment, the value of the drx-InactivityTimer may be expressed in absolute time (e.g., in millisecond or microsecond). Furthermore, the value of the drx-InactivityTimer duration may also be expressed in number of consecutive TTIs, where TTI is as defined above. As also described above, PDCCH monitoring period, PDCCH period, and PDCCH monitoring occasion may be used interchangeably herein, without limitation, unless otherwise specified. The parameter drx-InactivityTimer may also be referred to as the drx-Inactivity-Counter. Both drx-InactivityTimer and drx-Inactivity-Counter terms may be used interchangeably herein without limitation, unless otherwise specified.

A drx-RetransmissionTimer: Specifies the maximum number of consecutive PDCCH(s) monitoring period until a DL retransmission is received. In an alternative embodiment, the drx-RetransmissionTimer may be expressed in unit of subframe. In another embodiment, the drx-RetransmissionTimer may be expressed in absolute time for e.g. in millisecond or microsecond. In yet another embodiment, the drx_RetransmissionTimer may be expressed in unit of time duration that corresponds to transmission duration of the Transport Block (TB) under retransmission. Furthermore, the value of the drx-RetransmissionTimer duration may also be expressed in number of consecutive TTIs, where TTI is as defined above. As described above, PDCCH monitoring period, PDCCH period, or PDCCH monitoring occasion can be used interchangeably. The parameter drx-RetransmissionTimer may also be termed drx-RetransmissionCounter. Both drx-RetransmissionTimer and drx-RetransmissionCounter terms may be used interchangeably herein without limitation, unless otherwise specified.

A drx-ULRetransmissionTimer: Specifies the maximum number of consecutive PDCCH monitoring occasion(s) until a grant for UL retransmission is received. In an alternative embodiment, the drx-ULRetransmission-Timer may be expressed in unit of subframe. In another embodiment, the drx-ULRetransmissionTimer may be expressed in absolute time for e.g. in millisecond or microsecond. In yet another embodiment, the drx_UL-RetransmissionTimer may be expressed in unit of time duration that corresponds to the transmission duration of the Transport Block (TB) under retransmission. Furthermore, the value of the drx-ULRetransmission-Timer duration may also be expressed in number of consecutive TTIs, where TTI is as defined above. As described above, PDCCH monitoring period, PDCCH period, and PDCCH monitoring occasion can be used interchangeably herein, without limitation, unless otherwise specified. The parameter drx-ULRetransmissionTimer may also be referred to herein as drx-ULRetransmissionCounter. Both drx-ULRetransmissionTimer and drx-ULRetransmissionCounter terms may be used interchangeably herein, without limitation, unless otherwise specified.

A HARQ RTT Timer: This parameter specifies the minimum amount of PDCCH monitoring occasion(s) before a DL assignment for HARQ retransmission is expected by the MAC entity. In an alternative embodiment, the HARQ RTT Timer may be expressed in unit of subframe. In another embodiment, the HARQ RTT Timer may be expressed in absolute time for e.g. in millisecond or microsecond. In yet another embodiment, the HARQ RTT Timer may be expressed in unit of time duration that corresponds to the transmission duration of the Transport Block (TB) being transmitted. Furthermore, the value of the HARQ RTT Timer duration may also be expressed in the number of consecutive TTIs, where the TTI is as defined above. As described above, PDCCH monitoring period, PDCCH period, and PDCCH monitoring occasion can be used interchangeably herein, without limitation, unless otherwise specified. The parameter HARQ RTT Timer may also be referred to as the HARQ RTT Counter. Both HARQ HTT Timer and HARQ RTT Counter may be used interchangeably herein, without limitation, unless otherwise specified.

A UL HARQ RTT Timer: This parameter specifies the minimum amount of PDCCH monitoring occasion(s) before a UL HARQ retransmission grant is expected by the MAC entity. In an alternative embodiment, the UL HARQ RTT Timer may be expressed in unit of subframe. In another embodiment, the UL HARQ RTT Timer may be expressed in absolute time for e.g. in millisecond or microsecond. In yet another embodiment, the UL HARQ RTT Timer may be expressed in unit of the time duration that corresponds to the transmission duration of the Transport Block (TB) being transmitted. Furthermore, the value of the UL HARQ RTT Timer duration may also be expressed in a number of consecutive TTIs. As described above, PDCCH monitoring period, PDCCH period, and PDCCH monitoring occasion can be used interchangeably herein, without limitation, unless otherwise specified. The parameter UL HARQ RTT Timer may also be referred to as the UL HARQ RTT Counter. Both the UL HARQ RTT Timer and the UL HARQ RTT Counter terms may be used interchangeably herein, without limitation, unless otherwise specified.

shortDRX-cycle: Specifies the duration of a short DRX cycle. The duration may be expressed in number of consecutive PDCCH monitoring occasion(s). In this case, the PDCCH monitoring occasion may be one or more of the following, for example: the UE specific PDCCH monitoring occasion, the common group PDCCH monitoring occasion or a combination of common group PDCCH monitoring occasion and the UE specific PDCCH monitoring occasion. Alternatively, the duration of a shortDRX-Cycle may be expressed in terms of consecutive subframe(s). In another embodiment, the duration of a shortDRX-Cycle may be expressed in an absolute time unit (e.g., in millisecond or microseconds or second). Furthermore, the value of shortDRX-Cycle time duration may also be expressed in number of consecutive TTIs, as defined herein. As described above, PDCCH monitoring period, PDCCH period, and PDCCH monitoring occasion can be used interchangeably herein, without limitation, unless otherwise specified.drxShortCycleTimer: Specifies the duration during which the MAC entity follows the Short DRX cycle. The duration may be defined as the number of consecutive PDCCH monitoring occasion(s) the MAC entity shall follow the Short DRX cycle. In this case, the PDCCH monitoring occasion may be one or more of the following, for example and without limitation: the UE specific PDCCH monitoring occasion, the common group PDCCH monitoring occasion or a combination of common group PDCCH monitoring occasion and the UE specific PDCCH monitoring occasion. Alternatively, the drxShortCycleTimer may be expressed in terms of consecutive subframe(s) during which the MAC entity shall follow the Short DRX cycle. In another embodiment, the drxShortCycleTimer may be expressed in absolute time (e.g., in millisecond or microseconds or second). In this case, the drxShortCycleTimer may be defined as the number of time units during which the MAC entity shall follow the short DRX cycle. Furthermore, the value of drxShortCycleTimer may also be expressed in number of consecutive TTIs, as defined herein. As described above, the PDCCH monitoring period, PDCCH period, and PDCCH monitoring occasion can be used interchangeably herein, without limitation, unless otherwise specified. The parameter drxShortCycleTimer may also be referred to as drxShortCycleCounter. Both drxShortCycleTimer and drxShortCycleCounter terms may be used interchangeably herein, without limitation, unless otherwise specified.

longDRX-Cycle: Specifies the duration of the long DRX cycle. The duration may be expressed as the number of consecutive PDCCH monitoring occasion(s). In this case the PDCCH monitoring occasion may be one or more of the following: the UE specific PDCCH monitoring occasion, the common group PDCCH monitoring occasion or a combination of common group PDCCH monitoring occasion and the UE specific PDCCH monitoring occasion. Alternatively, the longDRX-cycle may be expressed in terms of consecutive subframe(s). In another embodiment, the long DRX-Cycle may be expressed in absolute time (e.g. in millisecond or microsecond or second). In this case, the longDRX-Cycle may be defined as the number of time units for e.g milliseconds, or microseconds or second. Furthermore, the value of longDRX-Cycle time duration may also be expressed in number of consecutive TTIs, as defined herein. As described above, PDCCH monitoring period, PDCCH period, and PDCCH monitoring occasion can be used interchangeably herein, without limitation, unless otherwise specified.

drxStartOffset: Specifies the subframe where the DRX Cycle starts or specifies the PDCCH monitoring occasion number where the DRX Cycle starts. Furthermore, in some cases, the drxStartOffset may be understood as the TTI where the DRX Cycle starts, where TTI is as defined herein.

Figure 6:
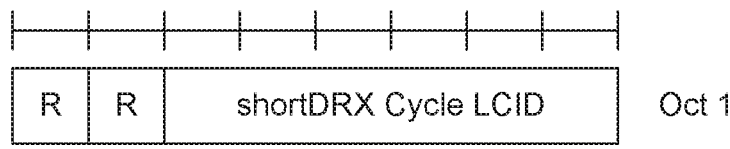
FIG. 6 depicts an example DRX command with a short DRX cycle.
Figure 7:
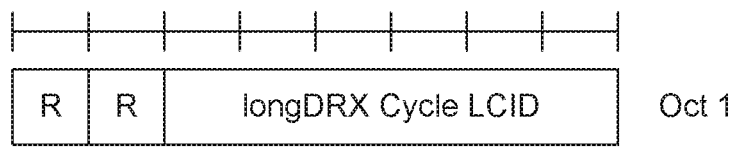
FIG. 7 depicts an example DRX command with a long DRX cycle.
Figure 8:
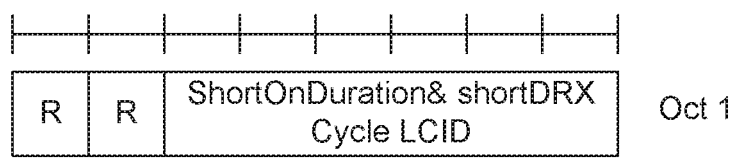
FIG. 8 depicts an example DRX command with a short DRX cycle using short and regular OnDurationTimer.
Figure 9:
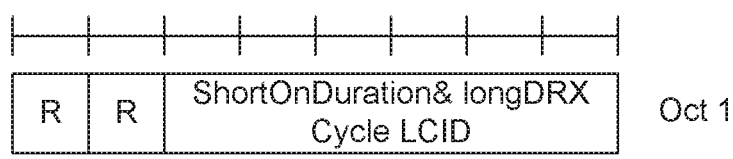
FIG. 9 depicts an example DRX command with a long DRX cycle using short and regular On DurationTimer.

FIGS. 6 to 9 provide example illustrations of different types of DRX commands. In the figures, 'R' refers to one reserved bit. FIG. 6 depicts an example DRX command MAC Control Element (MAC CE) PDU. When the UE receives this MAC CE from the gNB, the UE performs DRX using the short DRX cycle as described above. FIG. 7 depicts an example Long DRX command MAC CE PDU. When the UE receives this MAC CE from the gNB, the UE may perform DRX using the long DRX cycle as described herein. FIG. 8 depicts an example shortOnDuration DRX command MAC CE. When the UE receives this MAC CE from the gNB, the UE performs DRX using the short On Duration Timer (shortOnDurationTimer) as described herein. Furthermore, the UE may perform DRX using shortOnDurationTimer and the Short DRX Cycle as described herein. FIG. 8 depicts an example shortOnDuration DRX command MAC CE for Long DRX Cycle. When the UE receives this MAC CE from the gNB, the UE may performs DRX using the short On Duration Timer (shortOnDurationTimer) as described herein. Furthermore, the UE may perform DRX using shortOnDurationTimer and the Long DRX Cycle as described herein.

Figure 10:
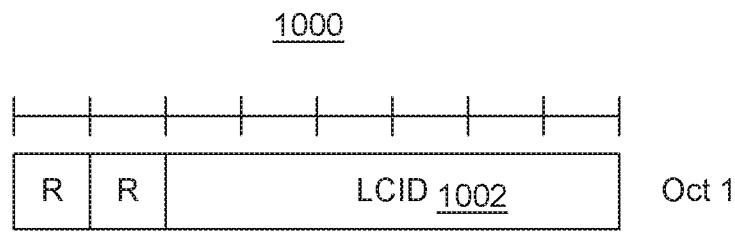
FIG. 10 depicts an example PDU header for a fixed size MAC CE.
Figure 11:
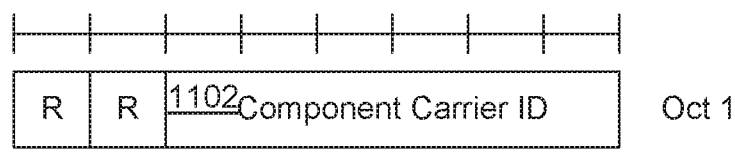
FIG. 11 depicts an example component carrier (CC) ID SDU.
Figure 12:
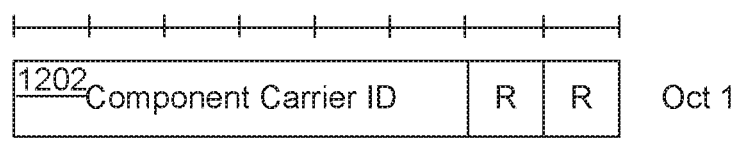
FIG. 12 depicts another example of a CC ID SDU.

FIGS. 10 to 18 provide example illustrations of fixed size MAC Control Element (MAC CE) for BandWidth Part (BWP) activation and deactivation. FIG. 10 depicts an example of a fixed size MAC CE PDU header 1000, with two reserved (R) bits and 6 bits long logical channel ID (LCID) 1002 for a total of 64 logical channel ID range. FIGS. 11 and 12 depict alternative examples of a component carrier ID part of a MAC CE SDU. In FIG. 11, a component carrier ID 1102 follows two reserved bits. In FIG. 12, a component carrier ID 1202 precedes two reserved bits. In these examples, it is assumed a Component Carrier ID may be coded with 6 bit for a total of 64 possible component carrier ID. Other possible representation are possible, for example, using a total of 8 bits with no reserve bit or using a total of less than 8 bits bit with more than two reserved bits.

Figure 13:
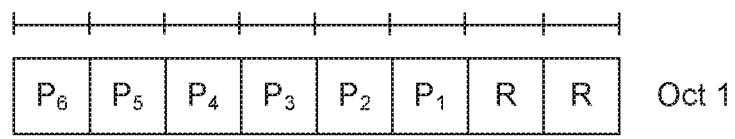
FIG. 13 depicts an example MAC CE command SDU for bandwidth part (BWP) activation or deactivation.
Figure 14:
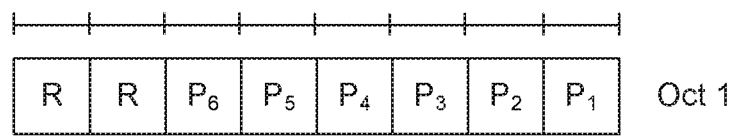
FIG. 14 depicts another example MAC CE command SDU for BWP activation or deactivation.
Figure 15:
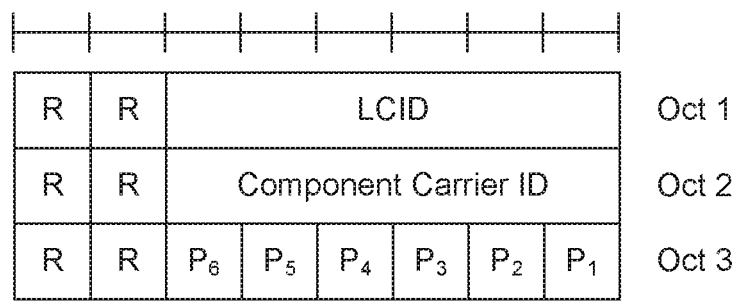
FIG. 15 depicts an example fixed size MAC CE command SDU for BWP activation or deactivation.
Figure 16:
FIG. 16 depicts another example fixed size MAC CE command SDU for BWP activation or deactivation.
Figure 17:
FIG. 17 depicts yet another example fixed size MAC CE command SDU for BWP activation or deactivation.

FIG. 13 and FIG. 14 depict alternative examples of activation or deactivation commands of BWP. These commands may have a fixed size and consist of a single octet containing 6 P-fields and two R-fields. With respect to Pi, where i represents a numerical index, if there is a BWP configured with an BWPindex i through RRC configuration, this field indicates the activation/deactivation status of the BWP with BWPIndex i, else the MAC entity shall ignore the Pi field. In an example, the Pi field is set to "1" to indicate that the BWP with BWPIndex i shall be activated. The Pi field is set to "0" to indicate that the BWP with BWPIndex i shall be deactivated; R, the reserved bits are set to 0. While this example assumes 6 bit long P-fields, the P-fields may be shorter or longer in alternative embodiments in which case the lengths of the P-fields and the R-fields are adjusted accordingly. FIGS. 15, 16, and 17 depict alternative examples of fixed size MAC CE PDU for BWP activation or deactivation.

Figure 18:
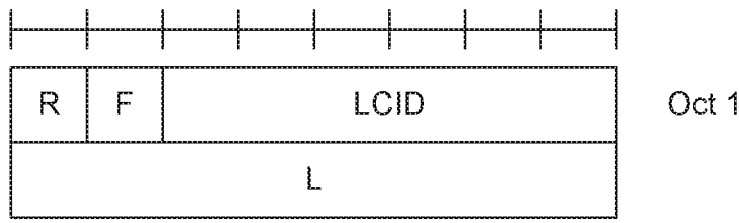
FIG. 18 depicts an example PDU header for variable size MAC CE.
Figure 19:
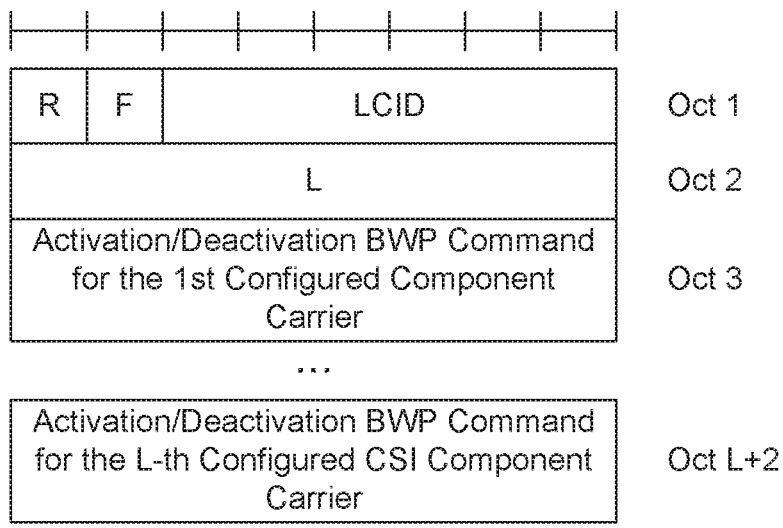
FIG. 19 depicts an example variable size MAC CE PDU for BWP activation or deactivation.

FIGS. 18 and 19 provide example illustrations of a variable size MAC header and MAC PDU BWP activation or deactivation MAC command control elements. The R-field is one bit reserved field that is set to 0, and the F-field indicates the size of the length field L. Each of the octet number 3 to octet number L+2 in FIG. 19 represents BWP activation or deactivation MAC command control element of the BWPs for each of the L component carriers the UE may be configured with. Each octet starting from octet number 3 to octet number L+2 can be encoded as illustrated in FIG. 13 or FIG. 14 and as described herein.

The Carrier component activation or deactivation itself may re-use the same MAC command control element as in LTE, but may have more octets to account for more component carriers. In an example, a new DRX Configuration Command MAC control element can be used to signal the DRX configurations to the UE. It can be identified by a MAC PDU subheader with a pre-defined LCID (for example, using a reserved value of "10100" in LTE Specs). For this MAC control element, it has a fixed 8-bit size and consists of one or two fields as described below.

In an example, the MAC CE contains two fields: index of current DRX configuration i and index of new DRX configuration j. Each may have K bits (K<=4). Such a MAC control element can be denoted as DRX Configuration Command MAC control element (i, j).

In another example, the MAC CE contains a single field: index of new DRX configuration j, which has K bits (K<=4). Such a MAC control element can be denoted as DRX (Configuration) Command MAC control element (j).

For convenience, a DRX Configuration Command MAC control element (i, j) is used in the description below as an example. It will be understood that the described-herein DRX procedures can be implemented by using DRX Configuration Command MAC control element (j) as well.

In an example, to support multiple DRX configurations in NR, when a DRX cycle is configured and the DRX parameters are set according to the DRX configuration index i, the Active Time includes the time while, for example and without limitation:
  onDurationTimer or drx-InactivityTimer or drx-Retransmission Timer or drx-ULRetransmission Timer or mac-ContentionResolution Timer is running; or
  a Scheduling Request is sent on PUCCH and is pending; or
  an uplink grant for a pending HARQ retransmission can occur and there is data in the corresponding HARQ buffer for synchronous HARQ process; or
  a PDCCH indicating a new transmission addressed to the C-RNTI of the MAC entity has not been received after successful reception of a Random Access Response for the preamble not selected by the MAC entity.

When DRX is configured, the MAC entity may, for each subframe:
  if a HARQ RTT Timer expires in this subframe:
    if the data of the corresponding HARQ process was not successfully decoded:
      start the drx-RetransmissionTimer for the corresponding HARQ process;
    if NB-IoT, start or restart the drx-InactivityTimer.
  if an UL HARQ RTT Timer expires in this subframe:
    start the drx-ULRetransmissionTimer for the corresponding HARQ process.
    if NB-IoT, start or restart the drx-InactivityTimer.
  if a DRX Command MAC control element or a Long DRX Command MAC control element is received:
    stop onDurationTimer;
    stop drx-InactivityTimer.
  if drx-InactivityTimer expires or a DRX Command MAC control element is received in this subframe:
    if the Short DRX cycle is configured:
      start or restart drxShortCycleTimer;
      use the Short DRX Cycle.
    else:
      use the Long DRX cycle.
  if drxShortCycleTimer expires in this subframe:
    use the Long DRX cycle.
  if a Long DRX Command MAC control element is received:
    stop drxShortCycleTimer;
    use the Long DRX cycle.
  if a DRX Configuration Command MAC control element (i, j) is received:
    UE stops using DRX parameters in the current DRX configuration i, and apply values of DRX parameters in the new DRX configuration j;
    If onDurationTimer or drx-InactivityTimer is running, the value may be reset or adjusted according to the new values in the new DRX configuration j. For example, value of running drx-InactivityTimer is adjusted to equal remaining value of drx-InactivityTimer+drx-InactivityTimer(j)-drx-InactivityTimer(i). If HARQ RTT Timer, UL HARQ RTT Timer, drx-RetransmissionTimer or drx-ULRetransmissionTimer is running, the new values may be applied after the currently running timers expire.
  If the Short DRX Cycle is used and [(SFN*10)+ subframe number] modulo (shortDRX-Cycle)= (drxStartOffset) modulo (shortDRX-Cycle); or
  if the Long DRX Cycle is used and [(SFN*10)+ subframe number] modulo (longDRX-Cycle)=drxStartOffset:
    if NB-IoT:
      if there is at least one HARQ process for which neither HARQ RTT Timer nor UL HARQ RTT Timer is running, start onDuration Timer.
    else:
      start onDurationTimer.
  during the Active Time, for a PDCCH-subframe, if the subframe is not required for uplink transmission for half-duplex FDD UE operation, and if the subframe is not a half-duplex guard subframe, and if the subframe is not part of a configured measurement gap, and if the subframe is not part of a configured Sidelink Discovery Gap for Reception, and for NB-IoT if the subframe is not required for uplink transmission or downlink reception other than on PDCCH; or during the Active Time, for a subframe other than a PDCCH-subframe and for a UE capable of simultaneous reception and transmission in the aggregated cells, if the subframe is a downlink subframe indicated by a valid eIMTA L1 signaling for at least one serving cell not configured with schedulingCellId and if the subframe is not part of a configured measurement gap and if the subframe is not part of a configured Sidelink Discovery Gap for Reception; or during the Active Time, for a subframe other than a PDCCH-subframe and for a UE not capable of simultaneous reception and transmission in the aggregated cells, if the subframe is a downlink subframe indicated by a valid eIMTA L1 signaling for the SpCell and if the subframe is not part of a configured measurement gap and if the subframe is not part of a configured Sidelink Discovery Gap for Reception:
monitor the PDCCH;
if the PDCCH indicates a DL transmission or if a DL assignment has been configured for this subframe:
if the UE is an NB-IoT UE, a BLUE or a UE in enhanced coverage:
start the HARQ RTT Timer for the corresponding HARQ process in the subframe containing the last repetition of the corresponding PDSCH reception;
else:
start the HARQ RTT Timer for the corresponding HARQ process;
stop the drx-RetransmissionTimer for the corresponding HARQ process.
if NB-IoT, stop drx-ULRetransmissionTimer for all UL HARQ processes.
if the PDCCH indicates an UL transmission for an asynchronous HARQ process or if an UL grant has been configured for an asynchronous HARQ process for this subframe:
start the UL HARQ RTT Timer for the corresponding HARQ process in the subframe containing the last repetition of the corresponding PUSCH transmission;
stop the drx-ULRetransmissionTimer for the corresponding HARQ process.
if the PDCCH indicates a new transmission (DL, UL or SL):
except for a NB-IoT UE configured with a single DL and UL HARQ process, start or restart drx-Inactivity Timer.
if the PDCCH indicates a transmission (DL, UL) for a NB-IoT UE:
if the NB-IoT UE is configured with a single DL and UL HARQ process:
stop drx-InactivityTimer.
stop onDurationTimer.
in current subframe n, if the MAC entity would not be in Active Time considering grants/assignments/DRX Command MAC control elements/Long DRX Command MAC control elements/DRX Configuration Command MAC control elements received and Scheduling Request sent until and including subframe n-5 when evaluating all DRX Active Time conditions as specified in this subclause, type-0-triggered SRS is not reported, in some cases.

if CQI masking (cqi-Mask) is setup by upper layers:
in current subframe n, if onDurationTimer would not be running considering grants/assignments/DRX Command MAC control elements/Long DRX Command MAC control elements/DRX Configuration Command MAC control elements received until and including subframe n-5 when evaluating all DRX Active Time conditions as specified in this subclause, CQI/PMI/RI/PTI/CRI on PUCCH shall not be reported.
else:
in current subframe n, if the MAC entity would not be in Active Time considering grants/assignments/ DRX Command MAC control elements/Long DRX Command MAC control elements/DRX Configuration Command MAC control elements received and Scheduling Request sent until and including subframe n-5 when evaluating all DRX Active Time conditions as specified in this subclause, CQI/PMI/RI/PTI/CRI on PUCCH is not reported.

Regardless of whether the MAC entity is monitoring PDCCH or not, the MAC entity receives and transmits HARQ feedback and transmits type-1-triggered SRS when such is expected. The MAC entity may monitor PDCCH addressed to CC-RNTI for a PUSCH trigger B on the corresponding CC even if the MAC entity is not in Active Time, for example, when such is expected. When the BL UE or the UE in enhanced coverage or NB-IoT UE receives PDCCH, the UE may execute the corresponding action specified in this subclause in the subframe following the subframe containing the last repetition of the PDCCH reception, where such subframe is determined by the starting subframe and the DCI subframe repetition number field in the PDCCH, unless explicitly stated otherwise.

Alternatively, the DRX Command MAC control element can be re-used to signal the DRX configurations to the UE. The DRX Command MAC control element can be identified by a MAC PDU subheader with a pre-defined LCID (for example, specified as "11110" in LTE Specs). It can have the same MAC control element format as aforementioned DRX Configuration MAC control element: a fixed 8-bit size and consists of one or two fields. The proposed herein DRX aspects can be implemented using DRX Configuration Command MAC control element as well. If a received DRX Command MAC control element carries a new DRX configuration index, it will indicate a DRX configuration switching, but will not put the UE into the DRX cycle (sleep). If a received DRX Command MAC control element carries the same DRX configuration index as the current index, it may put the UE into the DRX cycle (sleep) the same as the function of DRX Command MAC control element in LTE DRX procedures.

Turning now to multiple DRX configurations, in an example synchronized case, DRX configurations are coordinated for different cell groups. The cell groups may belong to the same RAN node (e.g., Master Node or Secondary Node) or the cell groups may belong to different RAN nodes (e.g., one cell group belongs to MN node and the other cell group belongs to the SN node). In the case of same cell group, in some cases, the group may consist of only one cell. When the cell group is one cell, the coordination of DRX configurations may be for multiple numerologies of the same cell or component carrier (CC). As used herein, unless otherwise specified, cell can be used interchangeably with CC. In an example carrier aggregation scenario, the cell groups belong to the same node. In an example dual connectivity or multi-connectivity scenario, the cell groups belong to different nodes.

In an example partially synchronized case, some of the DRX parameters (such as on duration timer, inactivity timer) are synchronized between cell groups or between numerology of the same cell group or same cell. In an example completely unsynchronized DRX configuration, DRX configurations are not coordinated, whether it is within the numerologies of the same cell, or between cell groups of the same node or between cell groups of different node.

With respect to signaling DRX configuration changes, triggers in the network (NW) may be implicit or explicit, such that the network knows when to update the parameters and when a triggering event in the UE occurs. In an implicit example, the NW detects issues with UL beam pair and decides to initiate beam alignment/beam pairing, and adjust DRX configuration parameters accordingly in support of the beam pairing operation or as a result of the decision to use a new beam pair. In an explicit example, the UE explicitly provides feedback to the network to trigger a DRX configuration update or beam alignment/pairing update.

It is recognized herein that, in some cases, when there is more than one active DRX parameter set, whether it is within the same CC across different numerologies, or between different CCs, or between different MAC entities, is that the values of the DRX parameters if different must be properly selected to avoid a situation where the UE never has the opportunity to sleep or has very little opportunity to sleep. As a result, even if the active DRX parameter set are different, there may be some coordination in the selection of the DRX parameter values for each DRX parameter set. To this end, in the case of multi-connectivity involving two different controlling RRC entities in the network side (for e.g. 5G dual connectivity or LTE-NR dual connectivity), there may be coordination between the RRC entities for the selection of the DRX parameter values. In one example, the UE may communicate the DRX parameter set or sets received from RRC entity 1 to RRC entity 2. The RRC entity 2 then may decide on RRC entity 2 appropriate DRX configuration parameters, using its knowledge of the DRX configuration parameters of RRC entity 1. Similarly, the UE may communicate the DRX parameter set or sets received from RRC entity 2 to RRC entity 1. The RRC entity 1 then decides on RRC entity 1 appropriate DRX configuration parameters, using its knowledge of the DRX configuration parameters of RRC entity 2. In another embodiment, the RRC entity 1 and RRC entity 2 may coordinate the selection of the DRX configuration parameter values over the network interface between the two RRC entities for e.g. Xn interface. In another embodiment, the UE may suggest (as DRX configuration assistance information) to either RRC entity 1 or RRC entity 2, values for DRX configuration parameters in order to optimize the UE sleep time.

FIGS. 20-23 depict examples for activation deactivation of DRX configurations using MAC Control Element (MAC CE) when multiple MAC CEs are configured. In the figures, Di represents DRX configuration i, which may be configured to the UE through RRC.

Turning now to DRX mechanisms to handle HARQ in NR, timing between DL data reception and corresponding acknowledgement in the UL (and/or the timing between UL data reception and corresponding acknowledgement in the DL) may be indicated by a field in the DCI from a set of values and the set of values is configured by higher layer. When higher layer configuration set of timing values is not known to the UE, a pre-defined default timing or a pre-defined set of timing values may be used by the UE.

In an example in which DL HARQ timing is used, a UE may use a dynamic HARQ RTT timer whose value is indicated in corresponding received DCI. When dynamic DL HARQ timing is used, a UE may use a dynamic drx-RetransmissionTimer whose value is mapped or derived from the field indicating DL HARQ timing in corresponding received DCI. When dynamic UL HARQ is timing used, a UE may use a dynamic UL HARQ RTT timer whose value is indicated in corresponding received DCI. When dynamic UL HARQ timing is used, a UE may use a dynamic drx-ULRetransmissionTimer whose value is mapped or derived from the field indicating DL HARQ timing in corresponding received DCI. In an example, grant-free transmission may also trigger a HARQ RTT timer and a retransmission timer. The retransmission timer's value may be derived based on A/N reception timing from gNB. The timing may be: pre-configured based on numerology/frequency; and/or configured through group common PDCCH/RRC for type1/type2 grant free configuration.

In some examples, when a DRX cycle is configured, the Active Time includes the time while:
  onDurationTimer or drx-InactivityTimer or drx-RetransmissionTimer or drx-ULRetransmissionTimer or mac-ContentionResolutionTimer is running; or
  a Scheduling Request is sent on PUCCH and is pending; or
  an uplink grant for a pending HARQ retransmission can occur and there is data in the corresponding HARQ buffer for synchronous HARQ process; or
  a PDCCH indicating a new transmission addressed to the C-RNTI of the MAC entity has not been received after successful reception of a Random Access Response for the preamble not selected by the MAC entity.

In some examples, when DRX is configured, the MAC entity may, for each TTI:
  if a HARQ RTT Timer expires in this TTI:
    if the data of the corresponding HARQ process was not successfully decoded:
      start the drx-RetransmissionTimer for the corresponding HARQ process. The value of drx-RetransmissionTimer for this HARQ process is mapped or derived from the its latest HARQ RTT Timer value, which may be dynamically indicated in the corresponding scheduling or activation PDCCH;
    if NB-IoT, start or restart the drx-InactivityTimer.
  if an UL HARQ RTT Timer expires in this TTI:
    start the drx-ULRetransmissionTimer for the corresponding HARQ process. The value of drx-RetransmissionTimer for this HARQ process is mapped or derived from the its latest UL HARQ RTT Timer value, which may be dynamically indicated in the corresponding scheduling or activation PDCCH;
    if NB-IoT, start or restart the drx-InactivityTimer.
  if a DRX Command MAC control element or a Long DRX Command MAC control element is received:
    stop onDurationTimer;
    stop drx-InactivityTimer.
  if drx-InactivityTimer expires or a DRX Command MAC control element is received in this TTI:
    if the Short DRX cycle is configured:
      start or restart drxShortCycleTimer;
      use the Short DRX Cycle.

else:
   use the Long DRX cycle.
if drxShortCycleTimer expires in this TTI:
   use the Long DRX cycle.
if a Long DRX Command MAC control element is received:
   stop drxShortCycleTimer;
   use the Long DRX cycle.
If the Short DRX Cycle is used and [(SFN*10x)+TTI] modulo (shortDRX-Cycle)=(drxStartOffset) modulo (shortDRX-Cycle), where X is the number of TTI in a subframe; or
if the Long DRX Cycle is used and [(SFN*10x)+TTI] modulo (longDRX-Cycle)=drxStartOffset, where X is the number of TTI in a radio subframe:
   if NB-IoT:
     if there is at least one HARQ process for which neither HARQ RTT Timer nor UL HARQ RTT Timer is running, start onDurationTimer.
   else:
     start onDurationTimer.
during the Active Time, for a PDCCH-TTI, if the TTI is not required for uplink transmission for half-duplex FDD UE operation, and if the TTI is not a half-duplex guard TTI and if the TTI is not part of a configured measurement gap and if the TTI is not part of a configured Sidelink Discovery Gap for Reception, and for NB-IoT if the TTI is not required for uplink transmission or downlink reception other than on PDCCH; or
during the Active Time, for a TTI other than a PDCCH-TTI and for a UE capable of simultaneous reception and transmission in the aggregated cells, if the TTI is a downlink TTI indicated by a valid eIMTA L1 signaling for at least one serving cell not configured with schedulingCellId and if the TTI is not part of a configured measurement gap and if the TTI is not part of a configured Sidelink Discovery Gap for Reception; or
during the Active Time, for a TTI other than a PDCCH-TTI and for a UE not capable of simultaneous reception and transmission in the aggregated cells, if the TTI is a downlink TTI indicated by a valid eIMTA L1 signaling for the SpCell and if the TTI is not part of a configured measurement gap and if the TTI is not part of a configured Sidelink Discovery Gap for Reception:
   monitor the PDCCH;
   if the PDCCH indicates a DL transmission or if a DL assignment has been configured for this TTI:
     if the UE is an mMTC/NB-IoT UE, a BL UE or a UE in enhanced coverage:
       start the HARQ RTT Timer for the corresponding HARQ process in the TTI containing the last repetition of the corresponding PDSCH reception. The value of HARQ RTT Timer is indicated by a field in this received PDCCH from a set of values and the set of values is configured by higher layer. Or default value(s) is used when higher layer configuration set of timing values is not known to the UE;
     else:
       start the HARQ RTT Timer for the corresponding HARQ process. The value of HARQ RTT Timer is indicated by a field in this received PDCCH from a set of values and the set of values is configured by higher layer. Or default value(s) is used when higher layer configuration set of timing values is not known to the UE;
     stop the drx-RetransmissionTimer for the corresponding HARQ process.
     if NB-IoT, stop drx-ULRetransmissionTimer for all UL HARQ processes.
   if the PDCCH indicates an UL transmission for an asynchronous HARQ process or if an UL grant has been configured for an asynchronous HARQ process for this TTI:
     start the UL HARQ RTT Timer for the corresponding HARQ process in the TTI containing the last repetition of the corresponding PUSCH transmission. The value of UL HARQ RTT Timer is indicated by a field in this received PDCCH from a set of values and the set of values is configured by higher layer. For SPS case (where an UL grant has been configured for an asynchronous HARQ process for this TTI), the value of UL HARQ RTT Timer is indicated by a field in the activation PDCCH from a set of values and the set of values is configured by higher layer. Or default value(s) is used when higher layer configuration set of timing values is not known to the UE;
     stop the drx-ULRetransmissionTimer for the corresponding HARQ process.
   if the PDCCH indicates a new transmission (DL, UL or SL):
     except for a NB-IoT UE configured with a single DL and UL HARQ process, start or restart drx-InactivityTimer.
   if the PDCCH indicates a transmission (DL, UL) for a NB-IoT UE:
     if the NB-IoT UE is configured with a single DL and UL HARQ process:
       stop drx-InactivityTimer.
     stop onDurationTimer.
during the Active time, if an autonomous grant-free UL transmission occurs,
   start the UL HARQ RTT Timer for the corresponding HARQ process TTI containing the last repetition of the corresponding PUSCH transmission. The value of UL HARQ RTT Timer is indicated by a field in the activation PDCCH from a set of values and the set of values is configured by higher layer. Or default value(s) is used when higher layer configuration set of timing values is not known to the UE;
   stop the drx-RetransmissionTimer for the corresponding HARQ process.
in current TTI n, if the MAC entity would not be in Active Time considering grants/assignments/DRX Command MAC control elements/Long DRX Command MAC control elements received and Scheduling Request sent until and including TTI n-5 when evaluating all DRX Active Time conditions as specified in this subclause, type-0-triggered SRS shall not be reported.
if CQI masking (cqi-Mask) is setup by upper layers:
   in current TTI n, if onDurationTimer would not be running considering grants/assignments/DRX Command MAC control elements/Long DRX Command MAC control elements received until and including TTI n-5 when evaluating all DRX Active Time conditions as specified in this subclause, CQI/PMI/RI/PTI/CRI on PUCCH shall not be reported.
else:
   in current TTI n, if the MAC entity would not be in Active Time considering grants/assignments/DRX Command MAC control elements/Long DRX Command MAC control elements received and Scheduling Request sent until and including TTI n-5 when evaluating all DRX Active Time conditions as specified in this subclause, CQI/PMI/RI/PTI/CRI on PUCCH is not reported.

Regardless of whether the MAC entity is monitoring PDCCH or not, the MAC entity receives and transmits HARQ feedback and transmits type-1-triggered SRS when such is expected. The MAC entity may monitor the PDCCH addressed to CC-RNTI for a PUSCH trigger B on the corresponding CC even if the MAC entity is not in Active Time, when such is expected.

When the BL UE or the UE in enhanced coverage or NB-IoT UE receives PDCCH, the UE executes the corresponding action specified in this subclause in the TTI following the TTI containing the last repetition of the PDCCH reception where such TTI is determined by the starting TTI and the DCI TTI repetition number field in the PDCCH, unless explicitly stated otherwise.

Turning now to mechanisms to handle Multiple SR Configurations in NR, in an example in which multiple SRs are configured, for each LCH, there may be a mapping between LCHs and SR configuration and the mapping may be configured by RRC signaling. And each SR configurations for a UE may have different PUCCH resources.

In an example, for an SR mapped to a LCH i, or a LCG i, it is denoted as SR(i). The Scheduling Request (SR) may be used for requesting UL-SCH resources for new transmission. When an SR is triggered, it may be considered as pending until it is cancelled. Pending SR(s) may be cancelled and sr-ProhibitTimer may be stopped when a MAC PDU is assembled and this PDU includes a BSR which contains buffer status up to (and including) the last event that triggered a BSR (see above), or, if pending SR(s) are triggered by Sidelink BSR, when a MAC PDU is assembled and this PDU includes a Sidelink BSR which contains buffer status up to (and including) the last event that triggered a Sidelink BSR (see above), or, if pending SR(s) are triggered by Sidelink BSR, when upper layers configure autonomous resource selection, or when the UL grant(s) can accommodate pending data available for transmission.

In some examples, upon the triggering of an SR:
If an SR is triggered on a particular LCH i or a LCG i, and there is no other SR pending, the MAC entity may set the SR_COUNTER(i) to 0.
Else if an SR is triggered on a particular LCH i or a LCG i, and there is other pending SRs
If the corresponding LCH(s) or LCG(s) of currently pending SR(s) have lower priority than the newly triggered SR, then the MAC entity may cancel existing pending SR(s) and stop the corresponding sr-ProhibitTimer. In some cases, this is equivalent to a higher priority SR and its configuration overwriting a lower priority SR and its configuration.
Else (the corresponding LCH(s) or LCG(s) of currently pending SR(s) have higher priority than the newly triggered SR), the MAC entity shall cancel newly triggered SR of LCH/LCG i.

In an example, as long as one SR is pending, the MAC entity may, for each TTI:
if no UL-SCH resources are available for a transmission in this TTI:
if the MAC entity has no valid PUCCH resource for SR of LCH/LCG i configured in any TTI and if rach-Skip for the MCG MAC entity or rach-SkipSCG for the SCG MAC entity is not configured: initiate a Random Access procedure on the SpCell and cancel all pending SRs;
else if the MAC entity has at least one valid PUCCH resource for SR of LCH/LCG i configured for this TTI and if this TTI is not part of a measurement gap or Sidelink Discovery Gap for Transmission and if sr-ProhibitTimer(i) is not running:
if SR_COUNTER(i)<dsr-TransMax(i):
increment SR_COUNTER(i) by 1;
instruct the physical layer to signal the SR on one valid PUCCH resource for SR;
start the sr-ProhibitTimer(i).
else:
notify RRC to release PUCCH for serving cells;
notify RRC to release SRS for serving cells;
clear any configured downlink assignments and uplink grants;
initiate a Random Access procedure on the SpCell and cancel pending SRs.

In some cases, the selection of which valid PUCCH resource for SR to signal SR on when the MAC entity has more than one valid PUCCH resource for SR in one TTI is left to UE implementation. The SR_COUNTER may be incremented for each SR bundle, and the sr-ProhibitTimer may be started in the first TTI of an SR bundle.

Turning now to DRX procedures with multiple SR configurations, because a higher priority SR and its configuration can overwrite pending lower priority SR and its configuration, embodiments described herein can support multiple SR configurations.

In an example, when a DRX cycle is configured, the Active Time includes the time while:
onDurationTimer or drx-InactivityTimer or drx-RetransmissionTimer or drx-ULRe transmission Timer or mac-ContentionResolution Timer (as described above) is running; or
a Scheduling Request is sent on PUCCH and is pending. When a higher priority SR and its configuration overwrite pending lower priority SR and its configuration, the Active Time determination should consider the change of UL grant timing as a response to SR (determined by the new corresponding sr-ProhibitTimer); or
an uplink grant for a pending HARQ retransmission can occur and there is data in the corresponding HARQ buffer for synchronous HARQ process; or
a PDCCH indicating a new transmission addressed to the C-RNTI of the MAC entity has not been received after successful reception of a Random Access Response for the preamble not selected by the MAC entity.

Modifications to the SRS and CSI feedback part are made in accordance with various embodiments. For example:
in current subframe n, if the MAC entity might not be in Active Time considering grants/assignments/DRX Command MAC control elements/Long DRX Command MAC control elements received and Scheduling Request sent until and including subframe n-5 when evaluating all DRX Active Time conditions as specified in this subclause, type-O-triggered SRS might not be reported. When a higher priority SR and its configuration overwrite pending lower priority SR and its configuration, the Active Time determination should consider the change of UL grant timing as a response to SR (determined by the new corresponding sr-ProhibitTimer).
if CQI masking (cqi-Mask) is setup by upper layers:
in current subframe n, if onDurationTimer might not be running considering grants/assignments/DRX Command MAC control elements/Long DRX Command MAC control elements received until and including subframe n-5 when evaluating all DRX Active Time conditions as specified in this subclause, CQI/PMI/RI/PTI/CRI on PUCCH is not reported.

else:

in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, CQI/PMI/RI/PTI/CRI on PUCCH shall not be reported. When a higher priority SR and its configuration overwrite pending lower priority SR and its configuration, the Active Time determination should consider the change of UL grant timing as a response to SR (e.g., determined by the new corresponding sr-ProhibitTimer).

In some examples, when a MAC entity is configured with multiple DRX configuration parameter sets as per one of the DRX configuration examples described above, the activation or deactivation of a CC or BWP may require an update or a reselection of active DRX configuration parameter set(s), for proper DRX control. For example, PDCCH configuration on a BWP may vary from one BWP to another, or even possibly within the same BWP, and may use different numerology from one BWP to another, or even possibly within the same BWP. Example embodiments now described provide an update of the active DRX configuration parameter set(s) (i.e. the DRX configuration parameter set) used by the MAC entity for DRX procedures.

In one example embodiment, the network signals, to the UE, the new DRX configuration parameter set(s) that the UE should use as active DRX configuration parameter set(s). The signaling may be implicit or explicit. In an example of implicit signaling, there is a one-to-one association between BWP and DRX configuration set. A BWP may have one set of DRX configuration set. In some cases, only one BWP with configured DRX configuration parameter set can be activated at a time per one MAC entity. The UE derives the DRX configuration set that can be active from the activation of the BWP(s). The UE MAC entity uses the DRX configuration parameter set of the last activated BWP with a configured DRX configuration parameter set as the active DRX configuration parameter set. It should be noted that in this example scheme, more than one BWP with configured DRX parameter set may be active at a time, but only one BWP with configured DRX parameter set can be activated at a time. In this example, the DRX configuration set may include two subsets of DRX parameter set. For example, one subset may be for group common PDCCH and another may be for UE specific PDCCH.

In another example of implicit signaling of active DRX configuration parameter set, there is a one-to-one association between CC and DRX configuration set. A CC may have one set of DRX configuration set. In some cases, only one CC with configured DRX configuration parameter set can be activated at a time per one MAC entity. The UE derives the DRX configuration set that can be active from the activation of the CC(s). The UE MAC entity uses the DRX configuration parameter set of the last activated CC with a configured DRX configuration parameter set as the active DRX configuration parameter set. It should be noted that in this example scheme, more than one CC with configured DRX parameter set may be active at a time, but only one CC with configured DRX parameter set can be activated at a time. In this example, the DRX configuration set may include two subsets of DRX parameter set. One subset may be for group common PDCCH and another may be for UE specific PDCCH.

In an example embodiment of explicit signaling of active DRX configuration parameter set, the gNB configures the UE with the DRX configuration set(s) to be used as active DRX configuration parameter set through RRC signaling. The signaling may include the actual DRX configuration parameter set or an index as a reference to a DRX configuration parameter set already known to the UE.

In another example of explicit signaling of active DRX configuration parameter set, the gNB configures the UE with the DRX configuration set(s) to be used as active DRX configuration parameter set through MAC CE command. In accordance with the example, the UE is first configured with a set of DRX configuration parameter sets using RRC signaling. Each of the DRX configuration parameter set is indexed, or ordered, as part of the RRC message. In the next step, each of the DRX configuration set(s) is activated or deactivated through MAC CE command. The MAC CE command may consist of a header and an SDU. The header may include a logical channel dedicated to activation and deactivation of DRX configuration parameter set. The UE uses the logical channel in the MAC CE header to differentiate the DRX configuration parameter set activation or deactivation MAC CE command from other MAC CE commands. The MAC CE SDU includes a bit (for the activation or de-activation of a single DRX configuration parameter set) or a bitmap for the activation or deactivation of more than one DRX configuration parameter set. In an example, a bit value of 1 instructs the MAC entity to activate the corresponding DRX configuration parameter set, while a bit value of 0 instructs the UE to deactivate the corresponding DRX configuration parameter set. The UE may identify the DRX configuration parameter set corresponding to a bit in the MAC CE SDU based on the position of the bit in the SDU. For example, the UE may identify the DRX configuration parameter if the index or order of the DRX configuration parameter set matches the position of the bit in the MAC CE SDU.

In another example of explicit signaling of active DRX configuration parameter set, the gNB configures the UE with the DRX configuration set(s) to be used as active DRX configuration parameter set through DCI signaling. In the first step, in accordance with the example, the UE is configured with a set of DRX configuration parameter sets using RRC signaling. Each of the DRX configuration parameter set is indexed, or ordered, as part of the RRC message. In the second step, in accordance with the example, each of the DRX configuration set(s) is activated or deactivated through DCI signaling. The DCI includes a bit (for the activation or de-activation of a single DRX configuration parameter set) or a bitmap for the activation or deactivation of more than one DRX configuration parameter set. A bit value of 1 instructs the UE to activate the corresponding DRX configuration parameter set, while a bit value of 0 instructs the UE to deactivate the corresponding DRX configuration parameter set. The UE identifies the DRX configuration parameter set corresponding to a bit in the DCI based on the position of the bit in the DCI field for activation or deactivation of DRX configuration parameter set, i.e. if the index or order of the DRX configuration parameter set matches the position of the bit in the DCI.

It is also recognized herein that, once the UE is updated with a new set of DRX configuration parameter set(s) that should be used for the control of DRX procedures, the UE may need to determine when to activate the configuration.

That is, in some cases, it must be determined when the new DRX configuration parameter set(s) is/are put into use. The timing of the activation may, in some cases, need to be known to both the UE and the network. In an example, the UE activates the DRX configuration parameter set(s) when the drx-InactivityTimer expires. In another example, the UE activates the DRX configuration parameter if a DRX Command MAC control element or a Long DRX Command MAC control element is received.

In some examples, the DRX Command MAC control element or a Long DRX Command MAC control element is combined with BWP Activation Command MAC control element, or CC Activation Command MAC control element, or DRX Configuration parameter set Activation Command MAC control element. The network may use such a command to order a change of active DRX configuration parameter set at the time of activation of BWP, or activation of CC or activation of DRX configuration parameter set, respectively. Upon receiving such a combined MAC control element, the UE may activate the indicated NEW DRX configuration parameter(s), for example together with the indicated BWP(s) if the received MAC CE includes BWP Activation Command MAC control element, or together with the indicated CC(s) if the received MAC CE includes CC Activation Command MAC control element.

In accordance with a partial network control embodiment, among the DRX configuration parameters set with which the UE is configured, the UE selects the DRX configurations parameter set to be used for DRX control based on rule(s) known to both the UE and the network.

It is recognized herein that the change of the time duration of NR-UNIT or TTI as defined herein may be the result of one or more of the following, presented by way of example and without limitation: change in PDCCH CORESET(s); change in active CC(s) or BWP(s); change in active DRX configuration parameter set(s); or change in UE battery level or change of the power saving mode. For example, an apparatus may detect a change in at least one of a physical downlink control channel (PDCCH) core resource set (CORESET), an active component carrier (CC), an active bandwidth part (BWP), an active discontinuous reception (DRX) configuration parameter set, a battery level of the apparatus, or a power saving mode of the apparatus. In response to detecting the change, the apparatus may modify the processor interrupt time unit. In some examples, the apparatus does not modify the processor interrupt time unit until a drx-InactivityTimer expires, a shortOnDurationTimer expires, or an onDurationTimer expires. Further, the apparatus might not modify the processor interrupt time unit until receiving a DRX Command MAC control element or a Long DRX Command MAC control element.

In accordance with various examples, the change of the time duration of NR-UNIT or TTI may occur, for example and without limitation when the drx-InactivityTimer expires. If a DRX Command MAC control element or a Long DRX Command MAC control element is received, the change of the time duration of the NR-UNIT or TTI may occur when the shortOnDurationTimer expires, or when the onDurationTimer expires. Upon reconfiguration of the NR-UNIT (TTI) value, the MAC entity may convert the configuration values of MAC timers and constants into TTI as per the new TTI value.

Figure 26:
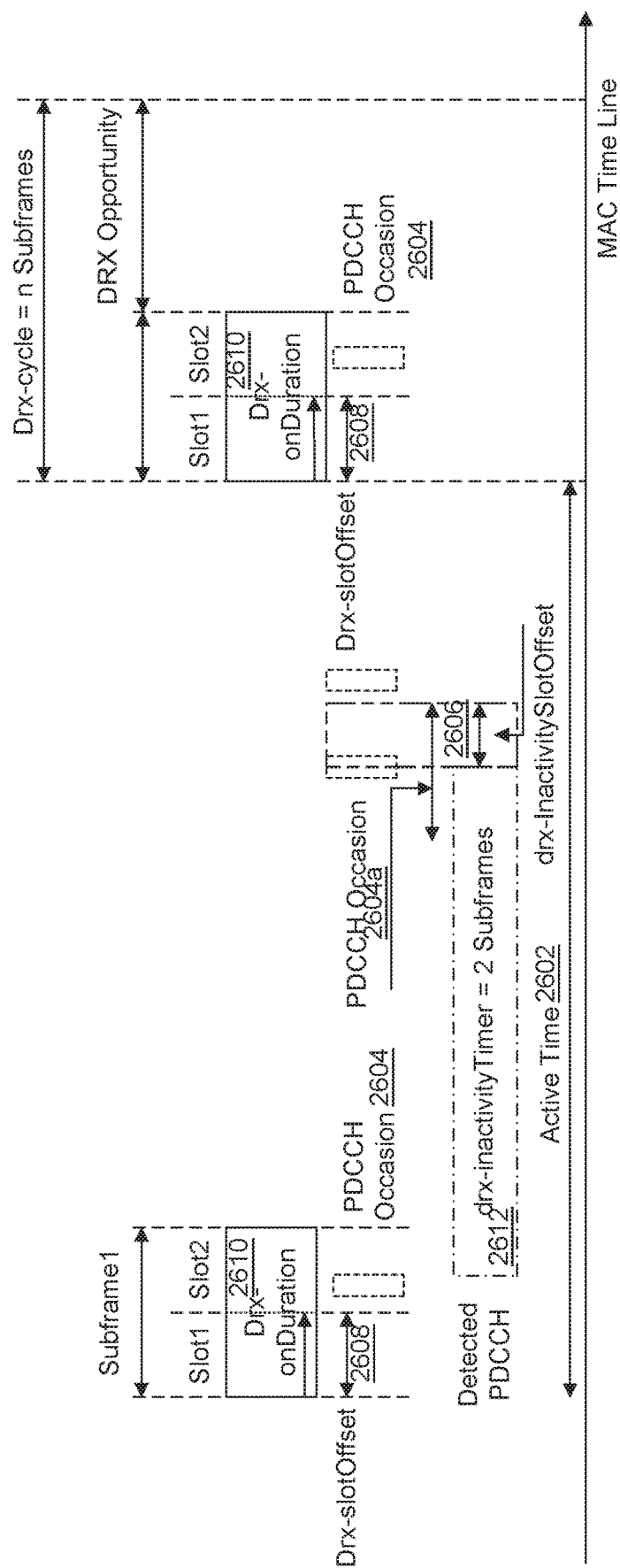
FIG. 26 depicts an example in which a UE aligns an Active Time to start and stop with PDCCH occasions.

In an example, with reference to FIG. 26, a UE may align (with respect to time) an Active Time 2602 to start and stop with PDCCH occasions 2604. Considering that a slot offset (drx-SlotOffset) 2608 may align the start of the drx-OnDurationTimer 2610 with the start of the PDCCH occasion 2604, in accordance with an aspect of this disclosure, the MAC entity may align the Active Time 2602 with PDCCH occasions 2604 by the addition of a time offset 2606 to the end of the drx-InactivityTimer 2602. In one embodiment, the addition of the time offset 2606 may be done in a way that takes into account the last PDCCH occasion 2604a that partially overlaps with the drx-InactivityTimer 2612. In this example case, the value of the time offset 2606 is a positive value. In another embodiment, the addition of the time offset 2606 may be done so as to exclude the last PDCH occasion 2604a that partially overlaps with the drx-InactivityTimer 2612. In this example case, the value of the time offset 2606 is a negative value. In one alternative embodiment, the unit of the time offset may be a slot, or a mini-slot. In another alternative embodiment, the unit of the time offset may be an OFDM symbol. In yet another embodiment, the unit of the time offset may be a millisecond. The RRC may configure the MAC entity with the value of the time offset. In one example, the RRC configures the MAC entity with the value of the time offset expressed in unit of slot, or mini-slot, or OFDM symbol, or in milliseconds. In another alternative example, the RRC configures the MAC entity with the value of the time offset expressed as a binary value, which indicates whether the use of a time offset is allowed or not. In this example case, the value may be configured as, for example, true or false, or as enable or not enable, or as 1 or 0 where 1 indicates that the use of time offset is allowed and 0 indicates that the use of time offset is not allowed. It will be understood that the binary values can alternatively used as indications as desired. In this alternative example of configuring the MAC entity with the time offset, the MAC entity may autonomously determine the actual value of the time offset to be applied as the amount of time that should be applied in order to align the Active Time with the last partially overlapping PDCCH occasion. It will be understood that the unit of the time offset may vary as desired, and various units are contemplated as being within the scope of this disclosure.

Thus, as described above, an apparatus, for instance a UE, may receive a configuration signal, and based on the configuration signal, determine a processor interrupt time to be used for timing of MAC procedure. In some cases, the MAC procedure is a DRX procedure. The processor interrupt time can be based on, for example, a capability of the apparatus, a minimum slot duration associated with the apparatus, or a minimum slot duration associated with a numerology. The capability of the apparatus may include a battery level associated with the apparatus, a category of the apparatus, or a power setting of the apparatus. As described above, the numerology may be an active uplink numerology, an active downlink numerology, a reference numerology, or a default numerology. The apparatus can monitor PDCCH occasions having respective start times. The start times can be separated from each other in time by a time interval consisting of one or a multiple of the processor interrupt time unit. Thus, the time interval may be an integer of one or more processor interrupt time units. Further, the apparatus can receive data during time periods having respective start times separated from each other by a time interval consisting of one or a multiple of the processor interrupt time unit. Further still, the data during time periods having respective start times separated from each other by a time interval consisting of one or a multiple of the processor interrupt time unit. Thus, in example DRX operations, the apparatus can process timers in units of time no less than, and in multiples of, the processor interrupt time unit. Thus, the apparatus can process timers in units that are an integer of one or more processor interrupt time units. Further, with reference to FIG. 26, the apparatus can initiate an active time when a PDCCH occasion begins. The apparatus can also terminate its active time when a PDCCH ends.

An example of an improvement to the DRX procedure that is currently specified in 38.321 V15.0.0 is now discussed. In the example, the unit of the time offset applied to the end of the drx-InactivityTimer is a slot, and the value of the time offset is a positive value.

In accordance with the example, the MAC entity may be configured by RRC with a DRX functionality that controls the UE's PDCCH monitoring. When in RRC_CONNECTED mode, if DRX is configured, the MAC entity may monitor the PDCCH discontinuously using the DRX operation specified herein; otherwise the MAC entity monitors the PDCCH continuously. When using DRX operation, the MAC entity may monitor PDCCH according to various requirements. The RRC may control DRX operation by configuring various timers, presented by way of example and without limitation:

- drx-onDurationTimer: the duration at the beginning of a DRX Cycle;
- drx-SlotOffset: the delay in slots before starting the drx-onDurationTimer;
- drx-InactivitySlotOffset: the delay in slots after drx_InactivityTimer expiry before going into inactivity;
- drx-InactivityTimer: the duration after the PDCCH occasion in which a PDCCH indicates an initial UL or DL user data transmission for the MAC entity;
- drx-RetransmissionTimerDL (per DL HARQ process): the maximum duration until a DL retransmission is received;
- drx-RetransmissionTimerUL (per UL HARQ process): the maximum duration until a grant for UL retransmission is received;
- drx-LongCycle: the Long DRX cycle;
- drx-ShortCycle (optional): the Short DRX cycle;
- drx-ShortCycle Timer (optional): the duration the UE shall follow the Short DRX cycle;
- drx-HARQ-RTT-TimerDL (per DL HARQ process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.

When a DRX cycle is configured, the Active Time may include the time while:

- drx-onDurationTimer or drx-InactivityTimer or drx-RetransmissionTimerDL or drx-RetransmissionTimerUL or ra-ContentionResolutionTimer (as described in subclause 5.1.5 of 38.321 V15.0.0) is running; or
- a Scheduling Request is sent on PUCCH and is pending (as described in subclause 5.4.4 of 38.321 V15.0.0); or
- a PDCCH indicating a new transmission addressed to the C-RNTI of the MAC entity has not been received after successful reception of a Random Access Response for the preamble not selected by the MAC entity (as described in subclause 5.1.4 of 38.321 V15.0.0);
- delaying going into DRX after drx_InactivityTimer expiry.

When DRX is configured, the MAC entity:
if a drx-HARQ-RTT-TimerDL expires:
  if the data of the corresponding HARQ process was not successfully decoded:
    start the drx-RetransmissionTimerDL for the corresponding HARQ process.
if an drx-HARQ-RTT-TimerUL expires:
  start the drx-RetransmissionTimerUL for the corresponding HARQ process.
if a DRX Command MAC CE or a Long DRX Command MAC CE is received
  stop drx-onDurationTimer;
  stop drx-InactivityTimer.
if a DRX Command MAC CE is received:
  if the Short DRX cycle is configured:
    start or restart drx-ShortCycleTimer;
    use the Short DRX Cycle.
  else:
    use the Long DRX cycle.
if drx-InactivityTimer expires:
  if the Short DRX cycle is configured:
    if drx-InactivitySlotOffset is configured:
      start or restart drx-ShortCycleTimer after drxInactivitySlotOffset;
      use the Short DRX Cycle after drxInactivitySlotOffset.
    else:
      start or restart drx-ShortCycleTimer;
      use the Short DRX Cycle.
  else:
    if drx-InactivitySlotOffset is configured:
      use the Long DRX cycle after drxInactivitySlotOffset;
    else:
      use the Long DRX cycle.
if drx-ShortCycle Timer expires:
  use the Long DRX cycle.
if a Long DRX Command MAC CE is received:
  stop drx-ShortCycleTimer;
  use the Long DRX cycle.
if the Short DRX Cycle is used, and [(SFN*10)+subframe number] modulo (drx-ShortCycle)=(drx-StartOffset) modulo (drx-ShortCycle); or
if the Long DRX Cycle is used, and [(SFN*10)+subframe number] modulo (drx-LongCycle)=drx-StartOffset:
  if drx-SlotOffset is configured:
    start drx-onDurationTimer after drx-SlotOffset.
  else:
    start drx-onDurationTimer.
if the MAC entity is in Active Time:
  monitor the PDCCH;
  if the PDCCH indicates a DL transmission or if a DL assignment has been configured:
    start the drx-HARQ-RTT-TimerDL for the corresponding HARQ process immediately after the corresponding PUCCH transmission
    stop the drx-RetransmissionTimerDL for the corresponding HARQ process.
  if the PDCCH indicates a UL transmission or if a UL grant has been configured:
    start the drx-HARQ-RTT-TimerUL for the corresponding HARQ process immediately after the first repetition of the corresponding PUSCH transmission;
    stop the drx-RetransmissionTimerUL for the corresponding HARQ process.
  if the PDCCH indicates a new transmission (DL or UL):
    start or restart drx-InactivityTimer.
else (i.e. not part of the Active Time):
  not report CQI/PMI/RI on PUCCH.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred to as 3G), LTE (commonly referred to as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 27A:
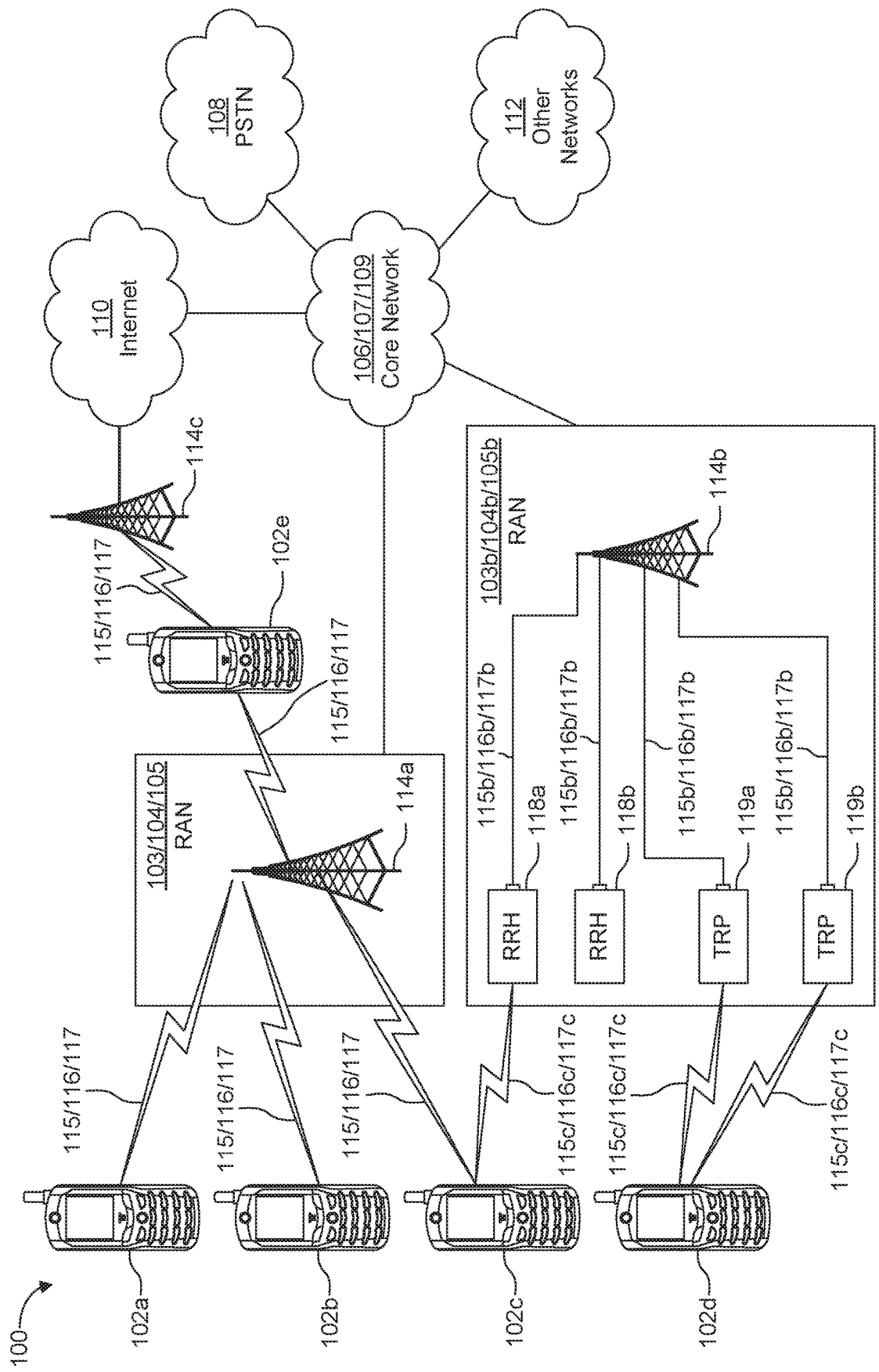
FIG. 27A illustrates one embodiment of an example communications system in which the methods and apparatuses described and claimed herein may be embodied.

FIG. 27A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 27A-27E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 27A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 27A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 27A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 27A may be configured to communicate with the base station 114a, which may employ a cellular-based radio technology, and with the base station 114c, which may employ an IEEE 802 radio technology.

Figure 27B:
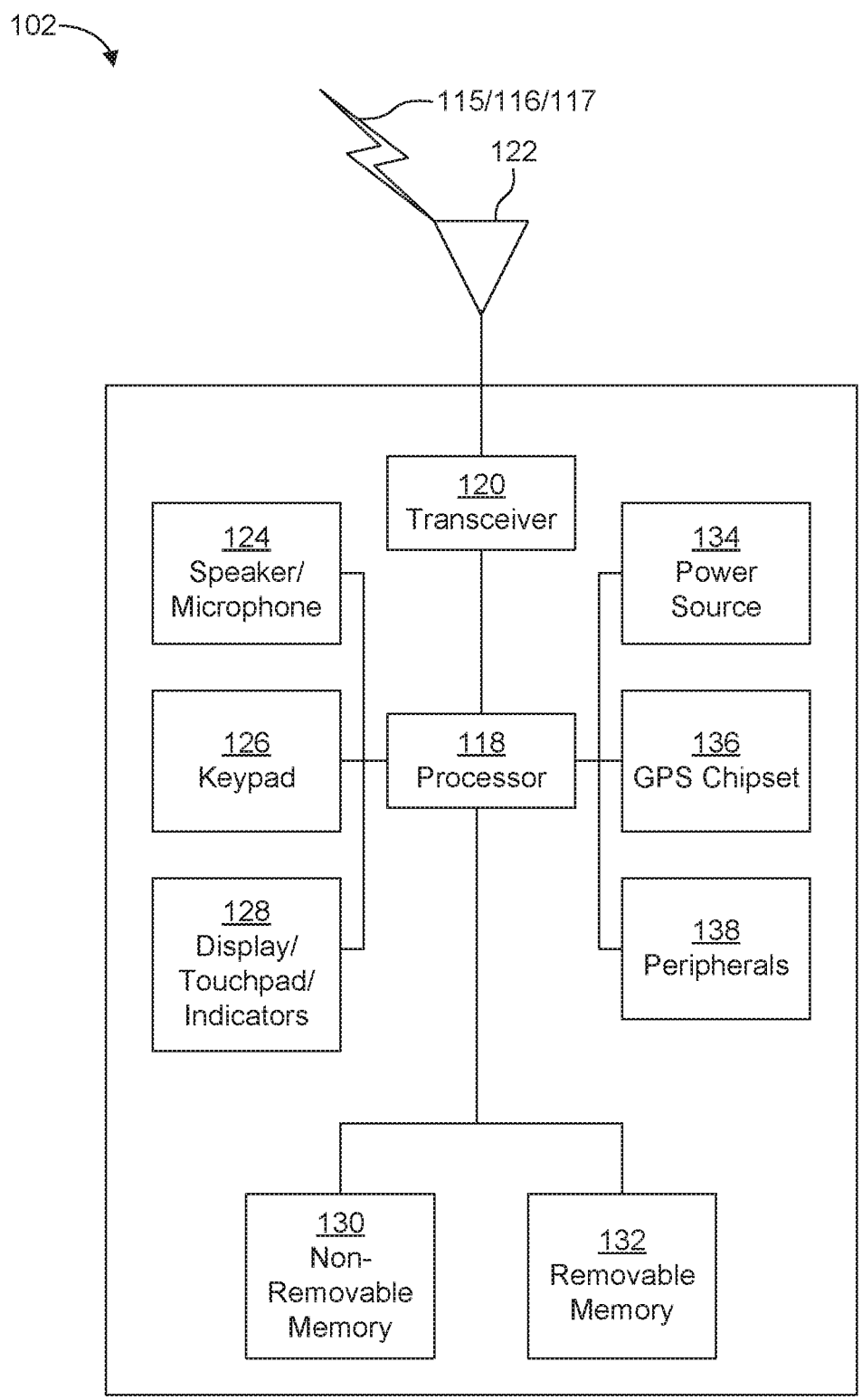
FIG. 27B is a block diagram of an example apparatus or device configured for wireless communications in accordance with the embodiments illustrated herein.

FIG. 27B is a block diagram of an example apparatus or device configured for wireless communications in accordance with the embodiments illustrated herein, such as for example, a WTRU 102. As shown in FIG. 27B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 27B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 27C:
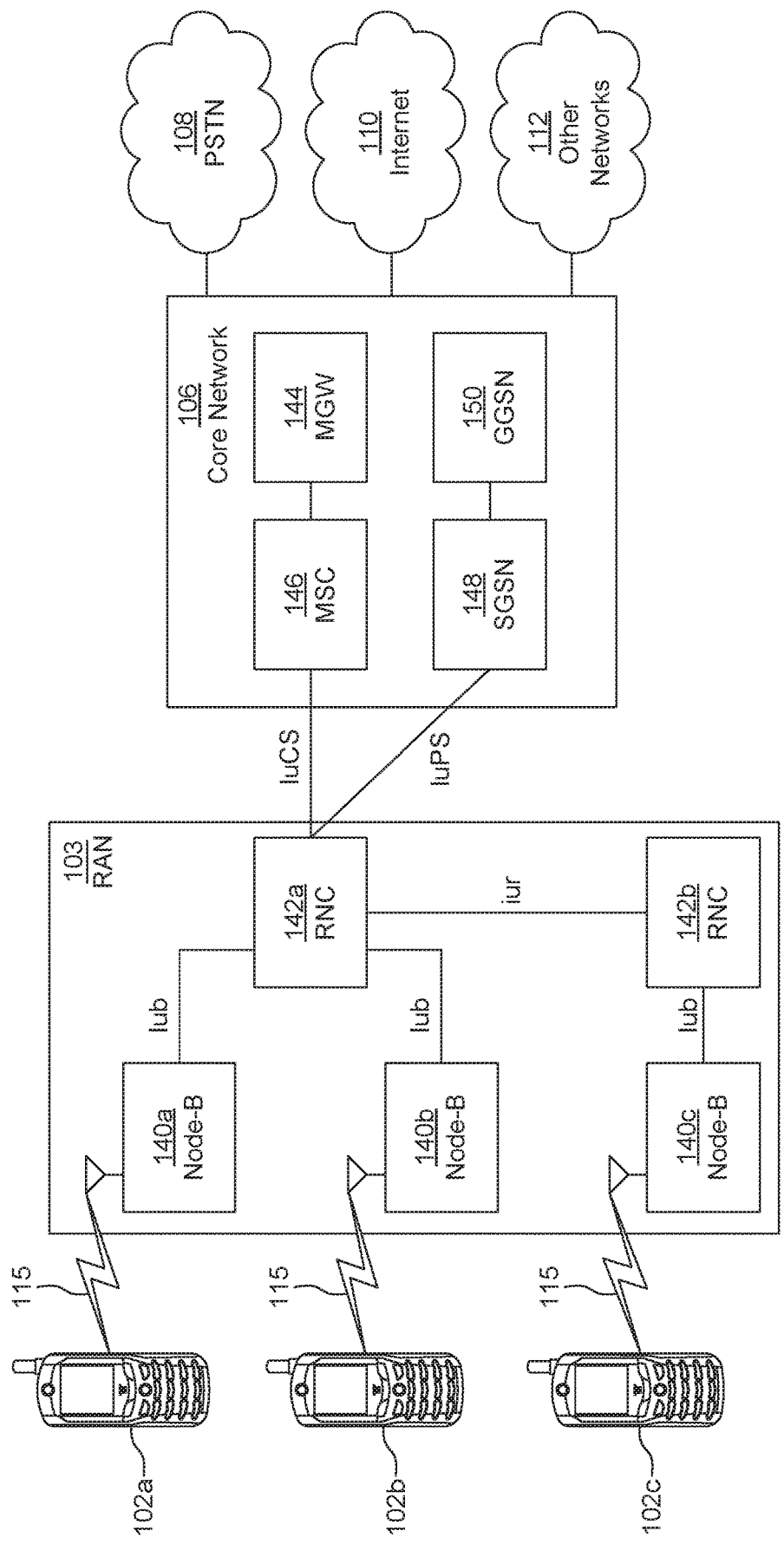
FIG. 27C is a system diagram of an example radio access network (RAN) and core network in accordance with an example embodiment.

FIG. 27C is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 27C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 27C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 27C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 27D:
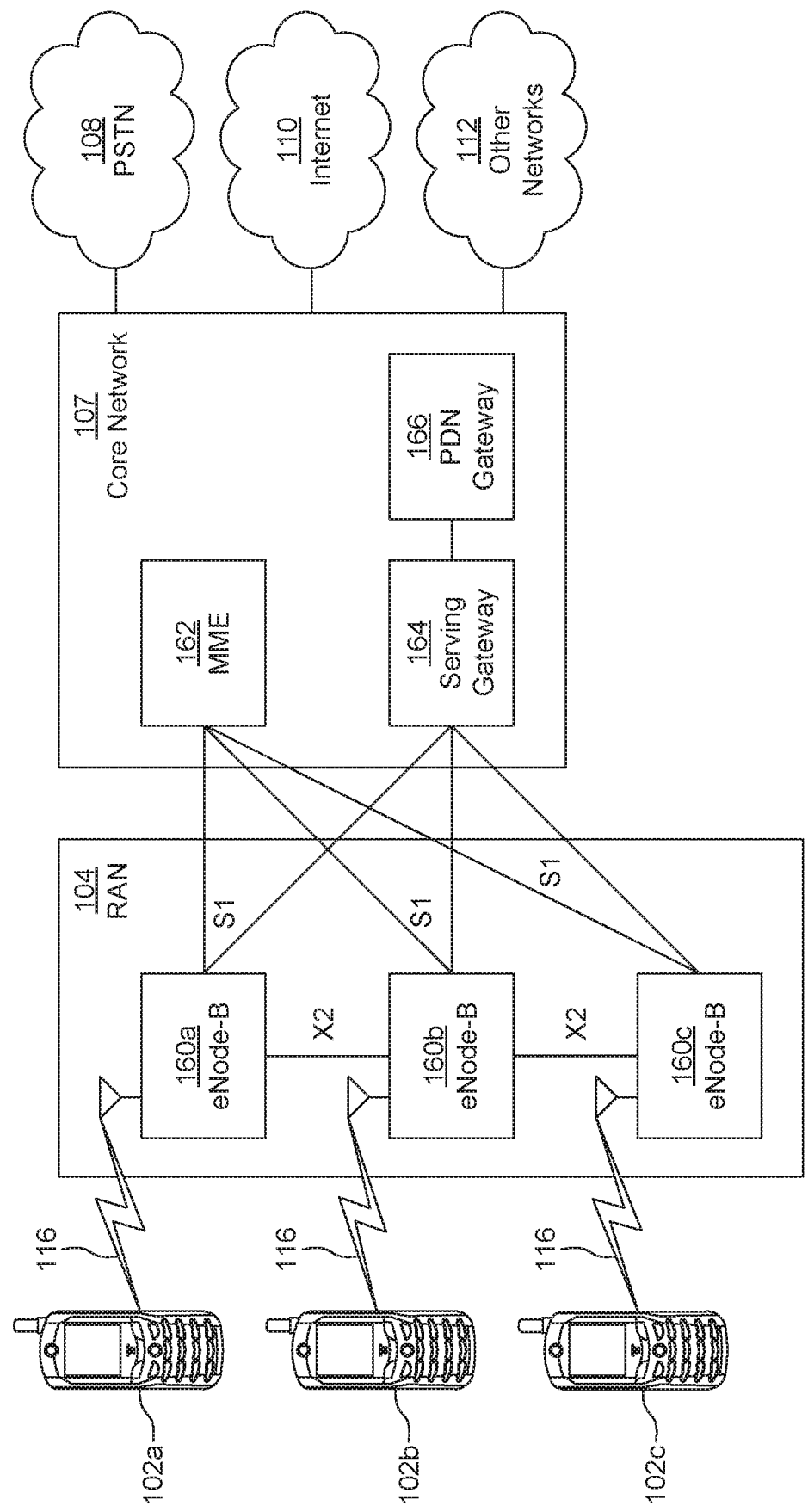
FIG. 27D is another system diagram of a RAN and core network according to another embodiment.
Figure 27E:
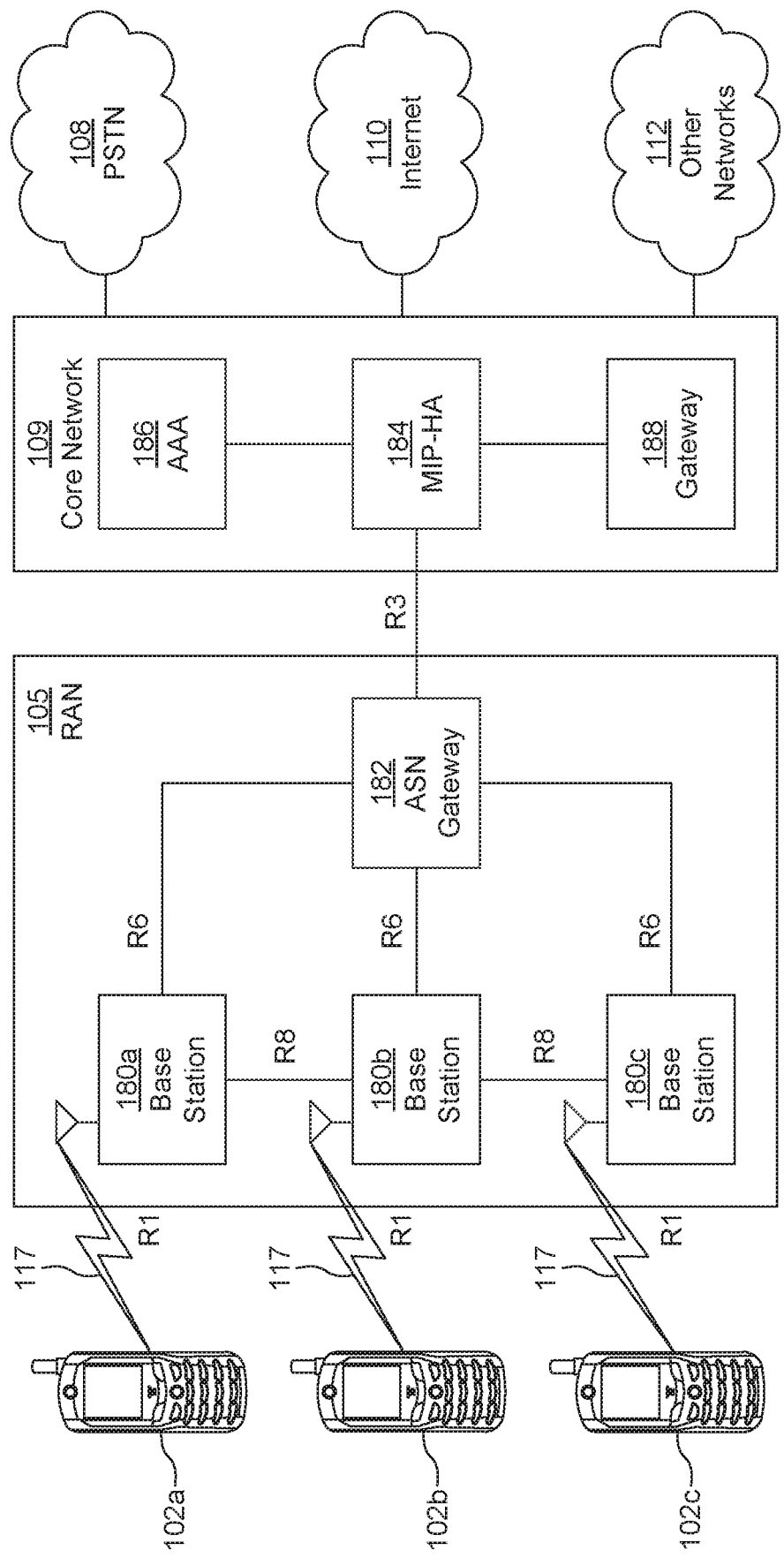
FIG. 27E is another system diagram of a RAN and core network according to another embodiment.

FIG. 27D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 27D, the eNode-Bs 160a, 160b, 160c may communicate with one another over an X2 interface.

The core network 107 shown in FIG. 27D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

FIG. 27D is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 27D, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 27D, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 27D, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 27A, 27C, 27D, and 27E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 27A, 27B, 27C, 27D, and 27E are provided by way of example only, and it is understood that the subject matter disclosed and claimed herein may be embodied or implemented in any similar communication system, whether presently defined or defined in the future.

Figure 27F:
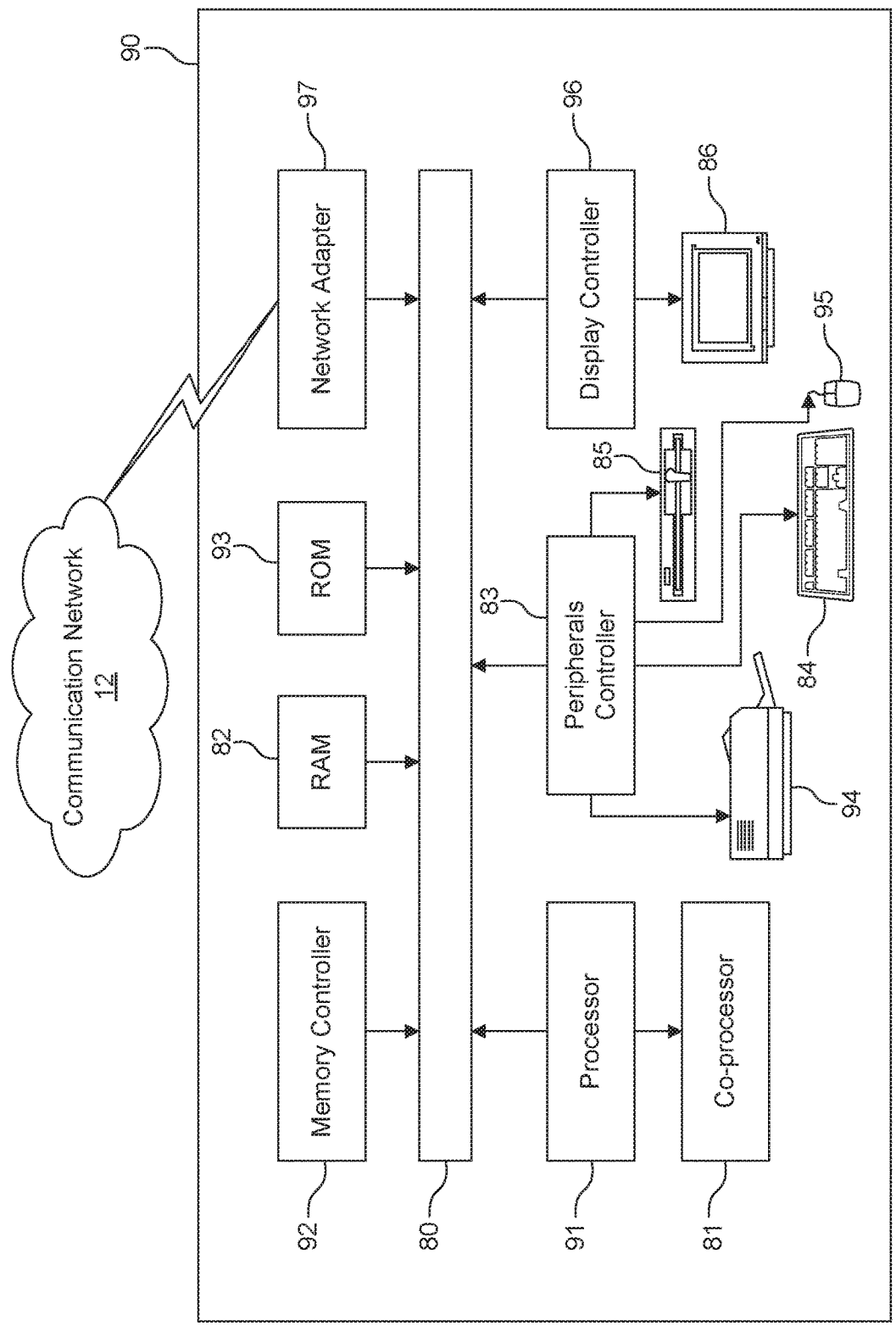
FIG. 27F is a block diagram of an exemplary computing system 90 in which one or more apparatuses of the communications networks illustrated in FIGS. 27A-E may be embodied.

FIG. 27F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to service level technologies that may appear in the above description. Unless otherwise specified, the acronyms used herein refer to the corresponding term listed below.

A/N Ack/Nack
BRS Beam Reference Signal
BPL Beam Pair Link
CE Control Element
DL Downlink
DRX Discontinuous Reception
eMBB enhanced Mobile Broadband
HARQ Hybrid Automatic Repeat Request
LTE Long term Evolution
MAC Medium Access Control
mMTC massive Machine Type Communication
NACK Non-ACKnowledgement
NR New Radio
PBCH Physical Broadcast Channel
PDCCH Physical Downlink Control Channel
PDSCH Physical Downlink Shared Data Channel
PRACH Physical Random Access Channel
PRB Physical Resource Block
RAN Radio Access Network
RNTI Radio Network Temporary Identifier
RRC Radio Resource Control
SR Scheduling Request
TDD Time Division Duplex
UE User Equipment
UL Uplink
URLLC Ultra-Reliable and Low Latency Communications

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   receiving a configuration signal; and
   based on the configuration signal, determining a processor interrupt time unit to be used for timing of a medium access control (MAC) procedure, wherein the MAC procedure is a discontinuous reception (DRX) procedure, and further comprising terminating an active time of the DRX procedure when a physical downlink control channel (PDCCH) occasion ends,
   wherein the processor interrupt time unit is based on at least one of: a capability of the apparatus, a minimum slot duration associated with the apparatus, or a minimum slot duration associated with a numerology.

2. The apparatus as recited in claim 1, wherein the capability of the apparatus comprises a battery level associated with the apparatus, a category of the apparatus, or a power setting associated with the apparatus.

3. The apparatus as recited in claim 1, wherein the numerology is an active uplink numerology, an active downlink numerology, a reference numerology, or a default numerology.

4. The apparatus as recited in claim 1, wherein the apparatus further comprises computer-executable instructions stored in the memory of the apparatus which, when executed by the processor of the apparatus, cause the apparatus to perform further operations comprising:
   monitoring physical downlink control channel (PDCCH) occasions having respective start times, the start times separated from each other in time by a time interval consisting of one or a multiple of the processor interrupt time unit.

5. The apparatus as recited in claim 1, wherein the apparatus further comprises computer-executable instructions stored in the memory of the apparatus which, when executed by the processor of the apparatus, cause the apparatus to perform further operations comprising:
   receiving data during time periods having respective start times separated from each other by a time interval consisting of one or a multiple of the processor interrupt time unit.

6. The apparatus as recited in claim 1, wherein the apparatus further comprises computer-executable instructions stored in the memory of the apparatus which, when executed by the processor of the apparatus, cause the apparatus to perform further operations comprising:

transmitting data during time periods having respective start times separated from each other by a time interval consisting of one or a multiple of the processor interrupt time unit.

7. The apparatus as recited in claim 1, wherein the apparatus further comprises computer-executable instructions stored in the memory of the apparatus which, when executed by the processor of the apparatus, cause the apparatus to perform further operations comprising:

initiating an active time when a physical downlink control channel (PDCCH) occasion begins.

8. The apparatus as recited in claim 1, wherein the apparatus further comprises computer-executable instructions stored in the memory of the apparatus which, when executed by the processor of the apparatus, cause the apparatus to perform further operations comprising:

during an active time of the apparatus, transmitting a beam failure recovery request; and during the active time, waiting for a response to the beam failure recovery request.

9. The apparatus as recited in claim 8, wherein the apparatus further comprises computer-executable instructions stored in the memory of the apparatus which, when executed by the processor of the apparatus, cause the apparatus to perform further operations comprising:

during a beam failure recovery, suspending one or more discontinuous reception timers; and resuming the one or more discontinuous reception timers when the beam failure recovery is complete.

10. The apparatus as recited in claim 1, wherein the apparatus further comprises computer-executable instructions stored in the memory of the apparatus which, when executed by the processor of the apparatus, cause the apparatus to perform further operations comprising:

detecting a change in at least one of a physical downlink control channel (PDCCH) core resource set (CORE-SET), an active component carrier (CC), an active bandwidth part (BWP), an active discontinuous reception (DRX) configuration parameter set, or a battery level of the apparatus, or a power saving mode of the apparatus; and in response detecting the change, modifying the processor interrupt time unit.

11. A wireless transmit/receive unit (WTRU) configured to perform operations comprising:

receiving a configuration message that causes configuration of an active time associated with a discontinuous reception (DRX) procedure, wherein the DRX procedure comprises monitoring a physical downlink control channel (PDCCH), and wherein the active time comprises a start time and a duration;

determining that the active time of the DRX procedure partially overlaps with a PDCCH occasion; and based on the determining the active time of the DRX procedure partially overlaps with the PDCCH occasion, disregarding the entirety of the PDCCH occasion.

12. The WTRU of claim 11, wherein disregarding the PDCCH occasion comprises altering the active time of the DRX procedure to cause the PDCCH occasion not to be monitored.

13. The WTRU of claim 12, wherein altering the active time of the DRX procedure comprises adjusting a start time of the active time of the DRX procedure such that the active time of the DRX procedure ends when the PDCCH occasion begins.

14. The WTRU of claim 11, wherein the configuration message comprises an RRC message.

15. The WTRU of claim 11, wherein monitoring the PDCCH comprises initiating an active time when the PDCCH occasion begins.

16. A method comprising:

receiving a configuration message that causes configuration of an active time associated with a discontinuous reception (DRX) procedure, wherein the DRX procedure comprises monitoring a physical downlink control channel (PDCCH), and wherein the active time comprises a start time and a duration;

determining that the active time of the DRX procedure partially overlaps with a PDCCH occasion; and based on the determining the active time of the DRX procedure partially overlaps with the PDCCH occasion, disregarding the entirety of the PDCCH occasion.

17. The method of claim 16, wherein disregarding the PDCCH occasion comprises altering the active time of the DRX procedure to cause the PDCCH occasion not to be monitored.

18. The method of claim 17, wherein altering the active time of the DRX procedure comprises adjusting a start time of the active time of the DRX procedure such that the active time of the DRX procedure ends when the PDCCH occasion begins.

19. The method of claim 16, wherein the configuration message comprises an RRC message.

20. The method of claim 16, wherein monitoring the PDCCH comprises initiating an active time when the PDCCH occasion begins.

* * * * *